United States Patent [19]

Sand et al.

[11] Patent Number: 5,104,450
[45] Date of Patent: Apr. 14, 1992

[54] FORMULATIONS OF CELLULOSE ESTERS WITH ARYLENE-BIS(DIARYL PHOSPHATE)S

[75] Inventors: I. Daniel Sand, Jonesborough; John A. Hyatt, Kingsport, both of Tenn.; Stephen S. Kelley, Bend, Oreg.

[73] Assignee: Eastman Kodak Company, Rochester, N.Y.

[21] Appl. No.: 588,210

[22] Filed: Sep. 26, 1990

[51] Int. Cl.$^5$ .............................................. C08L 1/26
[52] U.S. Cl. ................................... 106/177; 106/196
[58] Field of Search ...................... 106/177, 196, 18.18

[56] References Cited

U.S. PATENT DOCUMENTS

| | | | |
|---|---|---|---|
| 2,196,768 | 4/1940 | Hiatt | 167/32 |
| 2,782,128 | 2/1957 | Paist et al. | 106/177 |
| 3,022,287 | 2/1962 | Mench et al. | 260/224 |
| 3,291,625 | 12/1966 | Faraone et al. | 106/177 |
| 3,583,938 | 6/1971 | Okada et al. | 106/177 |
| 3,723,147 | 3/1973 | Wood et al. | 106/176 |
| 4,388,431 | 6/1983 | Mauric et al. | 524/119 |
| 4,794,072 | 12/1988 | Goddard | 430/546 |

FOREIGN PATENT DOCUMENTS

| | | |
|---|---|---|
| 264143 | 4/1988 | European Pat. Off. |
| 60-250053 | 12/1985 | Japan |
| 1598744 | 9/1981 | United Kingdom |

OTHER PUBLICATIONS

Derwent Abstract WPI Acc. No. 84-071065/12 (Japanese Kokai JP 59[1984]-24,736).
Derwent Abstract WPI Acc. No. 84-103542/17 (Japanese Kokai JP 59[1984]-45,351).
*Organic Syntheses,* Collected vol. 2, edited by A. H. Blatt, pp. 109-111.
*Encyclopedia of Polymer Science and Technology,* vol. 3, John Wiley & Sons, Inc., pp. 389-401 (1965).
Kirk-Othmer, *Encyclopedia of Chemical Technology,* 3rd Edition, vol. 5, Wiley—Interscience, New York (1979), pp. 120-126.
Kirk-Othmer, *Encyclopedia of Chemical Technology,* 3rd Edition, vol. 6, Wiley—Interscience, New York (1979), pp. 163-171.
R. M. Aseeva et al., *Adv. in Polymer Science,* 70, p. 217 (1985).
Daihatchi Chemical Industry Co., Ltd. Product Guide.

*Primary Examiner*—Aaron Weisstuch
*Assistant Examiner*—David M. Brunsman
*Attorney, Agent, or Firm*—Thomas R. Savitsky; William P. Heath, Jr.

[57] ABSTRACT

Blends of cellulose esters and arylene-bis(diaryl phosphate) compounds are described. The blends are useful for preparing film or other molded objects. The blends can possess several desirable properties such as flame-retardation, plasticization, formulaic stabilization and dimensional stabilization.

73 Claims, No Drawings

FORMULATIONS OF CELLULOSE ESTERS WITH ARYLENE-BIS(DIARYL PHOSPHATE)S

CROSS-REFERENCE TO RELATED APPLICATION

Reference is made to commonly-assigned application Ser. No. 07/588,650 of Julie S. Machell and I. Daniel Sand entitled "Cellulose Ester Film and Method of Manufacture" which is filed concurrently herewith, currently pending.

FIELD OF INVENTION

This invention concerns blends of cellulose esters and arylene-bis (diaryl phosphate)s having improved properties.

BACKGROUND OF THE INVENTION

Phosphates are one of several classes of compounds which are added to cellulose ester film and molded materials to improve commercially valuable properties. It is well known in the art that certain phosphorus containing compounds, such as phosphates, can act as flame retardants for many polymers including cellulose esters. It is also known that certain phosphorus containing compounds can function as plasticizers for various polymers including cellulose esters. Generally plasticization lowers the dimensional stability of the extruded sheet or film under conditions of increasing temperature. In some production situations the volatility of the phosphate causes major technical difficulties. Volatilization can change the composition of the phosphate in the product, thereby changing the properties of the product; and recondensation of phosphate vapors can lead to production difficulties and defects in the final product. Thus, a plasticizer which has low volatility and makes the material flame-retardant more dimensionally stable and more formulaically stable is of considerable value.

The effectiveness of certain phosphorus containing materials, especially triphenyl phosphate, as flame-retardants for plastics is well known (R. M. Aseeva and G. E. Zaikov, in *Adv. in Polymer Science*, 70, p. 217, 1985). In European Patent Application 264143, bisphosphates were claimed as flame-retardants for polyesters, but this reference does not teach application to cellulose esters. U.S. Pat. No. 2,782,128 and Kokai Patent No. SHO 60[1985]-25003 describe the use of bisphosphates with cellulose esters but the structures of these disclosed bisphosphates all have alkyl pendant groups with either alkylene bridges or monooxaalkylene bridges. None of these references teach aryl pendant groups with arylene bridges. U.S. Pat. No. 4,388,431 also teaches bisphosphates in combination with cellulose esters but these bisphosphates are all aliphatic diol cyclic phosphate esters and not diaryl phosphate structures. A related British Patent 1,598,744 claims a long list of monomeric or polymeric compounds which contain aliphatically- or aromatically-bound halogen as well as cyclic phosphates and thionophosphates as flame-retardants at not more than 5 weight percent addition.

It should be noted that most of the uses for cellulose esters require good clarity. Many of the phosphate components taught in the art for use with cellulose esters will not result in sufficient clarity. It is, therefore, apparent that a flame-retarding, formulaically stabilizing, dimensionally stabilizing plasticizer for both film and molded materials produced from cellulose esters is desirable. As judged by the clarity of the final solid product, this additive should be compatible with cellulose esters. Also, it would be desirable if the additives improved the thermal or mechanical properties of the film or molded product relative to prior art additives.

SUMMARY OF THE INVENTION

A novel blend of cellulose esters and certain phosphate compounds which meets the needs of the art has been discovered. More specifically, the present invention is directed to a blend comprising
(A) at least one cellulose ester, and
(B) 6 to about 30 percent, based on the weight of component (A), of at least one arylene-bis(diaryl phosphate) compound.

DETAILED DESCRIPTION OF THE INVENTION

The cellulose esters of the present invention include any cellulose ester capable of being molded into films or other articles. These cellulose esters can be of the acetate, propionate, or butyrate type, or mixed esters thereof. In addition, esters of higher carbon chain carboxylic acids, as well as other substituents, are also contemplated to be within the scope of the invention. For example, the cellulose esters may be substituted with hydrogen or $C_1$-$C_{20}$ alkanoyl, $C_1$-$C_{20}$ branched alkanoyl, $C_7$-$C_{20}$ aroyl, or $C_2$-$C_{20}$ heteroaroyl substituents, wherein the heteroatoms are N, O, and/or sulfur. In general, $C_2$ to $C_8$ substituents are preferred. More preferred substituents are $C_2$-$C_8$ alkanoyl and/or $C_7$ aroyl (i.e., benzoate). The cellulose esters useful in the present invention are either commercially available or can be prepared by techniques taught herein or known in the art, e.g., as taught in Kirk-Othmer, *Encyclopedia of Chemical Technology*, 3rd Edition, Vol. 5, Wiley-Interscience, New York (1979), pp. 120-126; and Vol. 6, pp. 163-171. For example, in Vol. 5 of Kirk-Othmer, the procedure for preparing cellulose acetate is taught which generally involves treatment of wood pulp with an excess of acetic acid and acetic anhydride in the presence of strong acid catalyst, such as sulfuric acid. The mixture is stirred at temperatures of about 80° C. until the cellulose is completely reacted and goes into solution as the triacetate. The resulting solution is treated with aqueous base to partially neutralize the sulfuric acid, and stirred for a period of time, depending on the amount of hydrolysis desired. Typically, acetyl content of the triacetate (about 44% acetyl) is reduced to about 40%, 32% and occasionally lower values as desired. The solution is then added to water, and the precipitated polymer is filtered, washed and dried.

Other procedures for preparing cellulose esters are described in U.S. Pat. Nos. 2,196,768 and 3,022,287, incorporated herein by reference in their entirety. A commercial source of cellulose esters is Eastman Chemical Products, Inc., Kingsport, Tenn. Preferred cellulose esters include cellulose acetate, cellulose propionate, cellulose butyrate, cellulose acetate propionate, cellulose acetate butyrate, and cellulose propionate butyrate.

Typical cellulose esters have a degree of substitution (DS) per anhydroglucose unit (AGU) of residual hydroxyl groups of about 0.1 to 2.0 with about 0.3 to 0.9 being a preferred range. The cellulose esters preferably have sufficient inherent viscosities (I.V.'s) to form self-supporting films by either solvent casting or extrusion. A preferred I.V. range is about 1.4 to about 1.9 dL/g as measured in a 60/40 by weight phenol/tetrachloroethane solvent at 25° C. at a concentration of 0.5 g of cellulose ester per 100 ml of solvent. Preferred acetyl DS is 0 to about 2.9, preferred propionyl DS is 0 to about 2.7 and preferred butyryl DS is 0 to about 2.6.

Preferred cellulose acetate has a DS per AGU of acetyl groups of about 2.1 to about 2.9. Preferred cellulose propionate has a DS per AGU of propionyl groups of about 2.1 to about 2.9. Preferred cellulose butyrate has a DS per AGU of butyryl groups of about 2.1 to about 2.9. Preferred cellulose acetate butyrate has a DS per AGU of acetyl groups of about 0.1 to about 2.1 and a DS per AGU of butyryl groups of about 0.5 to about 1.8; more preferred is a DS per AGU of acetyl groups of about 0.8 to about 1.2 and a DS per AGU of butyryl groups of about 1.5 to about 1.8. Preferred cellulose acetate propionate has a DS per AGU of acetyl groups of about 0.1 to about 2.1 and a DS per AGU of propionyl groups of about 0.4 to about 2.7; more preferred is a DS per AGU of acetyl groups of about 1.5 to about 2.1 and a DS per AGU of propionyl groups of about 0.5 to about 1.5. Preferred cellulose propionate butyrate has a DS per AGU of propionyl groups of about 0.4 to about 2.7 and a DS per AGU of butyryl groups of about 0.3 to about 2.6.

Viscosities of the cellulose esters can be measured according to American Society for Testing and Materials (ASTM) ball drop procedure D871 (Formula A). Viscosities of the cellulose esters typically range from about 10 to about 60, preferably about 15 to about 25.

The arylene-bis(diaryl phosphate) compound is preferably of the formula

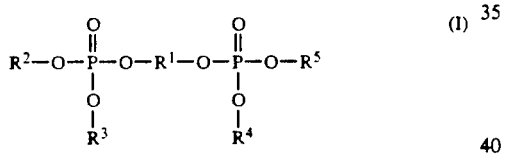

(I)

wherein
$R^1$ is selected from one of the following structures:

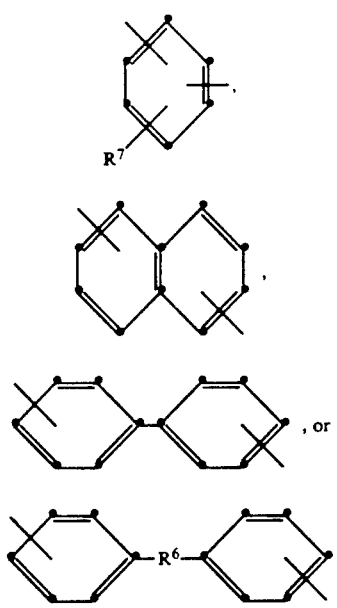

wherein any of the above $R^1$ structures may be substituted with one or more halogen atoms,
$R^2$ is

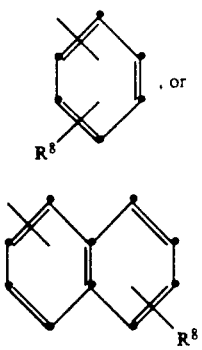

each of $R^3$, $R^4$, and $R^5$, independently, has the same meaning as $R^2$,

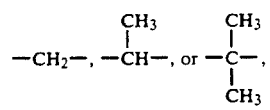

$R^7$ is H, aryl, haloaryl, a $C_1$-$C_8$ straight or branched chain alkyl, a $C_1$-$C_8$ straight or branched chain alkyl substituted with one or more halogen atoms, or a $C_1$-$C_8$ alkoxy, and
$R^8$ is $R^7$ or a halogen atom.

In Formula I, preferred $R^1$ moieties are non-halogenated. The most preferred $R^1$ moieties are

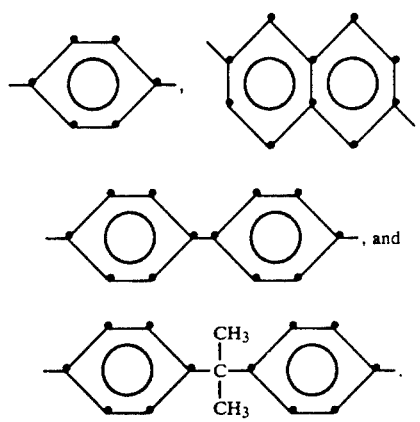

It is preferred that $R^2$, $R^3$, $R^4$, and $R^5$ are, independently, of the structure

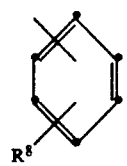

Preferred $R^8$ moieties are preferred $R^7$ moieties. Preferred $R^7$ moieties include H, $C_6$ aryl, $C_6$ chloroaryl, $C_6$ fluoroaryl, $C_6$ bromoaryl, naphthyl, fluoronaphthyl, chloronaphthyl, bromonaphthyl, a $C_1$-$C_8$ straight chain alkyl, a $C_1$-$C_8$ straight chain alkyl substituted with one to 17 fluorine atoms, a $C_1$-$C_8$ straight chain alkyl substituted with one to 17 chlorine atoms, a $C_1$-$C_8$ straight chain alkyl substituted with one to 17 bromine atoms, a $C_1$-$C_8$ branched chain alkyl, a $C_1$-$C_8$ branched chain alkyl substituted with one to 17 fluorine atoms, a $C_1$-$C_8$ branched chain alkyl substituted with one to 17 chlorine atoms, a $C_1$-$C_8$ branched chain alkyl substituted with one to 17 bromine atoms, or a $C_1$-$C_8$ alkoxy.

More preferred $R^7$ and $R^8$ moieties are H, $C_1$-$C_8$ straight chain alkyls, $C_1$-$C_8$ branched chain alkyls and $C_1$-$C_8$ alkoxys. Even more preferred $R^7$ and $R^8$ moieties are H, $C_1$-$C_4$ straight chain alkyls, $C_1$-$C_4$ branched chain alkyls, and $C_1$-$C_4$ alkoxys. Most preferred are where $R^7$ and/or $R^8$ are H.

Preferred $R^6$ moieties are

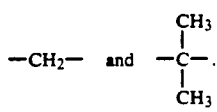

More commonly, $R^2$ and $R^3$ will be similar aryl or substituted and $R^4$ and $R^5$ will be similar aryl or substituted aryl groups. It is preferred that $R^2$ and $R^3$ are the same and that $R^4$ and $R^5$ are the same; more preferred is where $R^2$, $R^3$, $R^4$ and $R^5$ are the same. Most commonly, these arylene-bis(diaryl phosphate)s will be p- or m-phenylene bis(diphenyl phosphate), 1,6- or 2,7-naphthylene bis(diphenyl phosphate), p- or m-phenylene bis ((di-chlorophenyl) phosphate), 1,6- or 2,7-naphthylene bis(-(di-chlorophenyl) phosphate), p- or m-phenylene bis(-(di-methoxyphenyl) phosphate), 1,6- or 2,7-naphthylene bis((di methoxyphenyl) phosphate).

A more preferred arylene-bis(diaryl phosphate) compound is of the formula

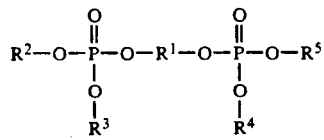

wherein
$R^1$ is

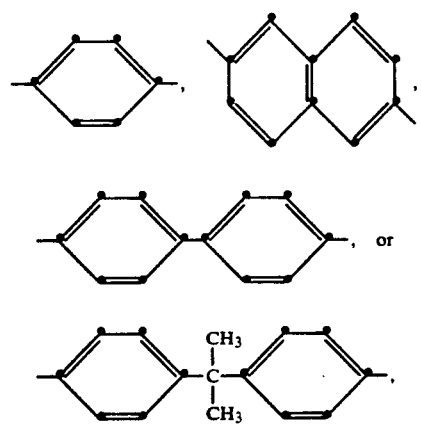

and each of $R^2$, $R^3$, $R^4$ and $R^5$ is of the formula

As used herein the term "aryl" means aryl groups of $C_6$-$C_{12}$, the term "haloaryl" means $C_6$-$C_{12}$ aryl groups substituted with one to nine halogen atoms; and the term "halogen" and derivative terms such as "halo" refer to F, Cl and Br.

The arylene-bis(diaryl phosphate) compounds can be prepared by the techniques taught herein and/or by techniques taught by U.S. Pat. No. 2,782,128 (incorporated herein by reference in its entirety) and "Organic Syntheses", Collected Vol. 2, edited by A. H. Blatt, pp. 109-111. The U.S. patent teaches the synthesis of bis phosphates and the "Organic Syntheses" reference teaches the synthesis of phosphates in general. The latter reference details the reaction of the alcohol of choice with phosphorus oxychloride with pyridine as the acceptor for the hydrochloric acid which is generated. The latter reference also gives the temperatures for the reaction which was used to make the bis phosphates in the examples.

It is further preferred that the arylene-bis(diaryl phosphate) compounds have one or more, preferably two or more, of the following characteristics: (1) when blended with a cellulose ester at a concentration of 6 weight % and formed into a film by solvent-casting or melt-casting, the film is clear, (2) when blended with a cellulose ester at a concentration of 6 weight % and the blend is formed into a film by solvent-casting or melt-casting, the glass transition temperature ("Tg"—as measured by ASTM Procedure D-3418 modified to heat the sample at a rate of 20° C. per minute) of the film is 7 or more degrees Centigrade lower than a film of the same cellulose ester without the compound and (3) when heated in air using ASTM Procedure D-3850 modified to heat the sample at a rate of 20° C. per minute, less than 2.5 percent of the compound's weight is lost when the compound reaches 225° C.

In the blends of the invention component (B) is present in an amount greater than 5 percent, based on the weight of component (A). It is preferred that the arylene-bis(diaryl phosphate) compound (i.e., component (B)) is present in an amount of about 10 to about 30 percent, more preferred is about 10 to about 24 percent, based on the weight of the cellulose ester (i.e., component (A)).

The blends of the invention may optionally include one or more other additives known to those familiar with the art. Such additives can be thermal stabilizers, antioxidants, acid scavengers, ultraviolet light stabilizers, colorants, other plasticizers and stripping aids. Examples of thermal stabilizers include triazoles, mono-benzoates, isocyanurates, phosphites or combinations of these. Examples of antioxidants include derivatives of phenol. Examples of ultraviolet stabilizers or acid scavengers include naphthanoates, epoxidized tallates, epoxidized oils and hindered amines. Examples of useful plasticizers include dimethyl phthalate, diethyl phthalate, triethyl phosphate, triphenyl phosphate, triethyl citrate, dibutyl sebacate, methoxymethyl phthalate, di-(2-methoxyethyl) phthalate, and the like. Examples of useful stripping aids include mono- and di-substituted polyethoxylated and mono- and di- substituted phosphate esters with one or more of the non-esterified hydroxyl groups in the free acid form.

Of course, the amount of other additive(s) can vary considerably and will depend upon, among other things, the particular additive(s) used and the desired properties of the blend. However, when present, these additives may be in the range of about 0.05 to about 45%. In the case of other plasticizers and stripping aids, a preferred amount of such other additives is about 8 to about 35%, more preferably about 18 to about 26%, based on the weight of the cellulose ester. In the case of thermal stabilizers, antioxidants, acid scavengers, ultraviolet light stabilizers, and/or colorants, a preferred amount of such other additives is about 0.05 to about 4%, more preferably about 0.1 to about 1.5%, based on the weight of the cellulose ester.

Blends of the invention can be made into films or other useful molded objects such as sheets or rods. Such films and molded objects can be prepared by solvent-casting, thermoplastic extrusion, or injection molding of the blends of the invention using techniques taught herein or by those disclosed in the art, for example, U.S. Pat. No. 3,291,625 which teaches solvent-casting and U.S. Pat. No. 3,723,147 (both of which are incorporated herein by reference in their entirety) which teaches roll-milling. Extrusion and injection molding are taught generally in "Encyclopedia of Polymer Science and Technology", Vol. 3, John Wiley & Sons, Inc., 1965, pp. 389–401.

The formulated cellulose esters may be dissolved in a useful solvent or solvent combination and cast into film form as described in numerous patents and publications. The cellulose ester may be dissolved in an amount of 0.05 to 0.30 parts of cellulose ester per part solvent medium by weight. Useful solvents include alcohols, ketones, esters, ethers, glycols, hydrocarbons and halogenated hydrocarbons. Particularly useful solvents which may be used alone or in combination with other solvents, as dictated by the solubility of the cellulose ester, are methanol, ethanol, propanol, butanol, acetone, 2-butanone, 2-pentanone, 2-hexanone, ethyl acetate, butyl acetate, ethyl propionate, dichloromethane, and trichloroethane. The desired properties of the solvent system can be controlled to some extent by the proportions of the components of the solvent.

In addition to formulating the cellulose ester with the arylene-bis(diaryl phosphate) in a homogeneous solution, formulating can be performed as a thermoplastic compounding process such as roll-milling or extrusion. These formulated cellulose esters may then be molded into articles through the application of heat and pressure. The formulated cellulose ester may be comprised of other additives such as stabilizers, antioxidants, buffers, other plasticizers and stripping aids. These additives and amounts are similar to the ones listed hereinbefore.

The blends of the invention are either amorphous or the melting temperature of the blends will typically range from about 130° C. to about 280° C.

The films and molded objects made from the blends of the invention can be used for many applications such as for packaging materials, tape base, tool handles such as screwdriver handles, photographic film base, and the like.

The blends of the invention preferably have reduced flammability and low processing temperature requirements. The blends also preferably have good clarity, low volatility (i.e., good formulaic stability) and high dimensional stability.

Regarding flammability, it is preferred that a blend of the invention retains at least 85% as much of its original weight after being heated to 400° C. as a control blend of the same cellulose ester formulated with triphenyl phosphate as a substitute for the same amount of arylene-bis (diaryl phosphate) of the invention (in weight percent based on the weight of cellulose ester) and it would be more preferred to retain at least as much as the original weight of the blend after being heated to 400° C. as a control blend of the same cellulose ester formulated with the same level of triphenyl phosphate.

Blends of this invention retain 15% (and more preferred 18%) or more of their initial weight after being heated to 400° C. if the blend is made from a cellulose acetate or retain 15% (and more preferred 17%) or more of their initial weight after being heated to 400° C. if the blend is made from a cellulose acetate propionate or a cellulose propionate or retain 12% (and more preferred 16%) or more of their initial weight after being heated to 400° C. if the blend is made from a cellulose butyrate or cellulose acetate butyrate when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951.

Regarding lower processing temperature, it is preferred that a blend of the invention has a glass transition temperature that is 7° C. or more (and more preferred 11° C. or more) below the glass transition temperature of the same blend made from the same cellulose ester formulated with no phosphate additive. The blends of the invention have glass transition temperatures less than 175° C. (and more preferred 170° C.) if the cellulose ester is a cellulose acetate or have glass transition temperatures less than 165° C. (and more preferred 155° C.) if the blend is made from a cellulose acetate propionate or cellulose propionate or have glass transition temperatures less than 130° C. (and more preferred 125° C.) for blends made with cellulose acetate butyrate or cellulose butyrate when measured in accordance with ASTM Procedure D-3418 modified to heat the sample at a rate of 20° C. per minute on a DuPont Autosampler Dual Cell 912.

Regarding clarity, it is preferred that the blends of the invention can be made into articles by solvent-casting or extrusion which are free of haze by visual inspection under fluorescent lights. The blends of this invention preferably are as clear, when made into articles, as the articles themselves are when made from the same cellulose ester with no phosphate additive.

Regarding formulaic stability or volatility, it is preferred that the highest temperature to which a blend of the invention can be heated while still retaining 97.5% of its initial weight, i.e., its formulaic stability, is not more than 30° C. below the highest temperature which a control blend of the same cellulose ester formulated with triphenyl phosphate as a substitute for the same amount of arylene-bis(diaryl phosphate) of the invention (based on weight percent of the weight of cellulose ester) can be heated while still retaining 97.5% of its initial weight. The highest temperature to which a preferred blend of this invention can be heated while still retaining 97.5% of its initial weight is 5° C. or more above the highest temperature to which a blend of the same cellulose ester formulated at the same level of triphenyl phosphate based on weight percent of the weight of cellulose ester can be heated while still retaining 97.5% of its initial weight.

Preferred blends of the invention retain 97.5% of their initial weight after being heated to 175° C. (and more preferred 200° C.) for cellulose acetates or retain 97.5% of their initial weight after being heated to 180° C. (and more preferred 200° C.) for cellulose acetate propionate or cellulose propionate or retain 97.5% of their initial weight after being heated to 300° C. if the blend is made from a cellulose butyrate or a cellulose acetate butyrate when measured in accordance with ASTM Procedure D-3850 modified to heat the sample at 20° C. per minute from room temperature to 500° C. in a stream of air having a dew point less than $-10°$ C. and flowing over the sample at a rate of from 0.5 to 4 scfh.

Finally, regarding dimensional stability, it is preferred that a blend of the invention elongates 2% at temperatures which are not more than 5° C. lower than a control blend of the same cellulose ester formulated with triphenyl phosphate as a substitute for the same amount of arylene-bis(diaryl phosphate) of the invention (based on the weight of the cellulose ester). It is more preferred that a blend of the invention elongates 2% at temperatures which are 5° C. or more than 5° C. higher than a blend of the same cellulose ester formulated to the same weight percent level with triphenyl phosphate (based on the weight of the cellulose ester). Preferred blends of the invention have less than 2% elongation when heated to 130° C. for cellulose acetate or have less than 2% elongation when heated to 120° C. for cellulose acetate propionate or cellulose propionate or have less than 2% elongation when heated to 75° C. for blends made with cellulose butyrate or cellulose acetate butyrate when measured in accordance with ASTM Procedure D-1637 on blends made into films that are from 10 to 14 cm long, 2.5 to 3 cm wide and 0.1 to 0.2 mm thick.

This invention can be further illustrated by the following examples, although it will be understood that these examples are included merely for purposes of illustration and are not intended to limit the scope of the invention.

EXAMPLE 1

Triphenyl phosphate was purchased from Eastman Kodak Company, Rochester, New York, and used without further modification. Gas chromatographic analysis showed it to be 98% pure.

EXAMPLE 2 p-Phenylene bis(diphenyl phosphate) was prepared from hydroquinone and diphenyl chlorophosphate. 32.7 grams of hydroquinone was dissolved in 500 ml of pyridine. This solution was cooled to 5° C. with the solution under a nitrogen purge. Then 200 grams of diphenyl chlorophosphate was added dropwise while keeping the temperature of the solution below 10° C. After the addition of the diphenyl chlorophosphate was complete the flask was warmed to room temperature and maintained at that temperature for 16 hours. 200 ml of water was added to the reaction solution and this aqueous pyridine solution was poured into 3 liters of water. The precipitate was collected and recrystallized from methanol. Yield was above 90%; mp=106°-107° C.; mass spectrum, m/e 574. Elemental analysis found, weight percent C=62.3 and weight percent H=4.22.

EXAMPLE 3

The preparation of di(p-methoxyphenyl)chlorophosphate was performed in a 500 ml 3.necked flask equipped with stirrer, thermometer, nitrogen atmosphere, and reflux condenser vented through an HCl scrubber. The flask was charged with 84 g (0.55 mole) of phosphorus oxychloride and 124 g (1.00 mole) of hydroquinone monomethyl ether. The mixture was stirred and heated to reflux until the pot temperature reached 210°-220° C. (ca. 3 hours). The mixture was then cooled, transferred to a one-necked flask and distilled in vacuo through a short Vigreaux column. About 20 g of distillate of bp 110°-120° C./0.2 mm Hg was obtained and discarded. The pot residue was then distilled through a kugelrohr apparatus to give 101 g of product as a light brown oil which crystallized upon standing. The material was not characterized further but was used directly for the preparation of p-phenylene-bis(di-p-methoxyphenyl phosphate) in the following manner. A solution of 5.5 g (0.05 mole) of hydroquinone in 100 ml of dry pyridine was stirred at room temperature under nitrogen. In one portion 32.8 g (0.10 mole) of di(p-methoxyphenyl)chlorophosphate was added and the mixture was stirred for 20 hours. Aqueous workup similar to that described in Example 2 followed by recrystallization from ethyl acetate gave 21.4 g of product with a mp 106°-109° C. Mass spectrum: m/e 694. Elemental analysis found weight percent C=58.7 and weight percent H=4.78.

EXAMPLE 4 m-Phenylene bis(diphenyl phosphate) was prepared by the same procedure as used in Example 2 except that resorcinol was used instead of hydroquinone and the reagents were in the following amounts. The reaction was performed with 11.0 g of resorcinol and with 59 g of diphenyl chlorophosphate in 100 ml of pyridine and afforded 50 g of product as a viscous oil which gradually crystallized on standing. Recrystallization of a sample from ether/hexane gave a solid product of mp=34°-38° C. Mass spectrum, m/e 574. Elemental analysis found weight percent C=62.5 and weight percent H=4.22%.

EXAMPLE 5

Chlorohydroquinone bis(diphenyl phosphate) was prepared in the following manner. A solution of 6.0 g of chlorohydroquinone in 100 ml of dry pyridine was stirred at room temperature under nitrogen. Dropwise addition of 25.0 g of diphenyl chlorophosphate was followed by stirring for 96 hours at room temperature. The reaction mixture was poured into ice water and the resulting oil allowed to solidify. Two recrystallizations from isopropyl alcohol afforded 19.4 g of product of mp=66°-68° C. The product had the following elemental analysis: weight percent C=59.0 and weight percent H=3.83.

EXAMPLE 6

1,5-Naphthalene-bis(diphenyl phosphate) was prepared in the following manner. A solution of 8.0 g of 1,5-naphthalene diol in 75 ml of dry pyridine was stirred under nitrogen and treated dropwise with 30.8 g of diphenyl chlorophosphate. After stirring at room temperature for 20 hours the mixture was poured into ice water and a tan solid product recovered by filtration. Recrystallization from methanol gave 11.3 g product of mp=135°-138° C. Mass spectrum: m/e 624. The product had the following elemental analysis: weight percent C=64.8 and weight percent H=4.35.

EXAMPLE 7

2,6-Naphthalene-bis(diphenyl phosphate) was prepared in a manner similar to that of Example 2; 16.0 g of 2,6-naphthalene diol was allowed to react with 69.0 g of diphenyl chlorophosphate to yield 32.5 g (55%) of product with a mp=95°-98° C. Mass spectrum: m/e 624. Elemental analysis found weight percent C=65.4 and weight percent H=4.31.

watch glasses to limit evaporation. Solvent was allowed to evaporate for 24 hours and residual solvent was removed in a vacuum oven at 60° C. The amounts of phosphate used in the formulations were calculated to give the weight percent phosphate concentrations in the final films that are specified in Table IX. The clarity was determined by qualitative observations under fluorescent light. The thermal transitions were determined by differential scanning calorimetry in accordance with ASTM Procedure D-3418 modified to heat the sample at a rate of 20° C. per minute on a DuPont Autosampler Dual Cell 912. The clarity and thermal transitions for the films of this example are also given in Table IX.

TABLE IX

| | Clarity and Thermal Transitions of Cellulose Acetate, CA-435-75, with Arylene-bis(diaryl phosphate)s | | | | |
|---|---|---|---|---|---|
| Formulation Designation | Phosphate Source (Example) | Phosphate Concentration (wt. %) | Glass Transition Temperature (°C.) | Melting Temperature (°C.) | Clarity |
| ab | 2 | 6 | 160 | 285 | Clear |
| ac | 2 | 12 | 142 | 279 | " |
| ad | 2 | 20 | 135 | 277 | " |
| ae | 2 | 30 | 131 | 277 | " |
| ag | 3 | 6 | 163 | 288 | " |
| ah | 3 | 12 | 156 | 286 | " |
| ai | 3 | 20 | 148 | 285 | " |
| aj | 3 | 30 | 137 | 282 | " |
| al | 4 | 6 | 153 | 288 | " |
| am | 4 | 12 | 139 | 283 | " |
| an | 4 | 20 | 130 | 281 | " |
| aq | 5 | 6 | 141 | 288 | " |
| ar | 5 | 12 | 138 | 284 | " |
| as | 5 | 20 | 132 | 283 | " |
| av | 8 | 6 | 163 | 290 | " |
| aw | 8 | 12 | 150 | 284 | " |
| ax | 8 | 20 | 143 | 287 | " |
| ay | 8 | 30 | 130 | 282 | " |
| ba | 6 | 6 | 166 | 290 | " |
| bb | 6 | 12 | 137 | 284 | " |
| bc | 6 | 20 | 130 | 281 | " |
| bf | 7 | 6 | 159 | 290 | " |
| bg | 7 | 12 | 145 | 286 | " |
| bh | 7 | 20 | 130 | 284 | " |
| bi | 7 | 30 | 125 | 283 | " |

EXAMPLE 8

Bisphenol A bis(diphenyl phosphate) was prepared by the reaction of 11.4 g of bisphenol A with 29.6 g of diphenyl chlorophosphate in 100 ml of pyridine, which was performed by the protocol of Example 2. Recrystallization from isopropanol gave 12 g of the title compound of mp=56°-58° C. Mass spectrum: m/e 692. Elemental analysis found weight percent C=68.2 and weight percent H=5.04.

EXAMPLE 9

Cellulose ester film-forming formulations were made from cellulose acetate, CA-435-75, which had a degree of acetyl substitution of 2.9 and an IV of 1.8 dL/g. CA-435-75 and the phosphate additive with a total combined weight of six grams were dissolved in 60 ml of methylene chloride/methanol (9/1) by gently mixing for 12 to 24 hours at ambient temperatures. The solutions were poured onto glass plates and covered with

EXAMPLE 10 (Comparative)

A film of cellulose acetate, CA-435.75, was prepared in a manner similar to that described in Example 9 except that the formulation contained no phosphate additive. The clarity and thermal transitions were determined as described in Example 9. The results are in Table X.

TABLE X

| | Clarity and Thermal Transitions of Cellulose Acetate, CA-435-75, Without Any Phosphate Additive | | | | |
|---|---|---|---|---|---|
| Formulation Designation | Example From Which Phosphate Was Derived | Phosphate Concentration (wt. %) | Glass Transition Temperature (°C.) | Melting Temperature (°C.) | Clarity |
| zw | None | 0 | 182 | 296 | Clear |

EXAMPLE 11 (Comparative)

Films of cellulose acetate, CA-435-75, formulated with the triaryl phosphate of Example 1 was prepared in a manner similar to that described in Example 9 with the substitution of the triaryl phosphate for the arylene-bis(diaryl phosphate)s. The amounts of phosphate included in the formulations were calculated to produce films with the weight percentages of phosphate specified in Table XI. The clarity and thermal transitions were determined as described in Example 9 and are recorded in Table XI.

TABLE XI

Clarity and Thermal Transitions of Cellulose Acetate, CA-435-75, Formulated with Triphenyl Phosphate

| Formulation Designation | Example From Which Phosphate Was Derived | Phosphate Concentration (wt. %) | Glass Transition Temperature (°C.) | Melting Temperature (°C.) | Clarity |
|---|---|---|---|---|---|
| cb | 1 | 6 | 160 | 286 | Clear |
| cc | 1 | 12 | 137 | 284 | " |
| cd | 1 | 20 | 131 | 282 | " |
| ce | 1 | 30 | 125 | 279 | " |

EXAMPLE 12

Thermogravimetric analysis was performed on the films formulated as described in Example 9. Such an analysis was performed by heating the samples in a stream of air at a rate of 20° C. per minute. The temperature at which the sample had lost 2.5% of its original weight was defined as the temperature of formulaic stability: the higher this temperature is, the more stable the formulation of cellulose acetate with plasticizer. The temperatures of formulaic stability for the films produced by Example 9 are given in Table XII.

TABLE XII

Formulaic Stability of Cellulose Acetate, CA-435-75, Formulated with Arylene-bis(diaryl phosphate)s

| Formulation Designation | Example From Which Phosphate Was Derived | Phosphate Concentration (wt. %) | Thermogravimetric Analysis of the Temperature of Formulaic Stability (°C.) |
|---|---|---|---|
| ab | 2 | 6 | 350 |
| ac | 2 | 12 | 345 |
| ad | 2 | 20 | 330 |
| ae | 2 | 30 | 330 |
| ag | 3 | 6 | 365 |
| ah | 3 | 12 | 355 |
| ai | 3 | 20 | 345 |
| aj | 3 | 30 | 325 |
| av | 8 | 6 | 315 |
| aw | 8 | 12 | 315 |
| ax | 8 | 20 | 330 |
| ay | 8 | 30 | 340 |
| bf | 7 | 6 | 300 |
| bg | 7 | 12 | 310 |
| bh | 7 | 20 | 330 |
| bi | 7 | 30 | 330 |

EXAMPLE 13 (Comparative)

The formulaic stability of films of cellulose acetate, CA-435-75, formulated with the triaryl phosphate of Example 1 was determined in a manner similar to that described in Example 12. The temperatures of formulaic stability for these films are given in Table XIII.

TABLE XIII

Formulaic Stability of Cellulose Acetate, CA-435-75, Formulated with Triphenyl Phosphate

| Formulation Designation | Example From Which Phosphate Was Derived | Phosphate Concentration (wt. %) | Thermogravimetric Analysis of the Temperature of Formulaic Stability (°C.) |
|---|---|---|---|
| cb | 1 | 6 | 300 |
| cc | 1 | 12 | 260 |
| cd | 1 | 20 | 340 |

EXAMPLE 14

The dimensional stability of the films of cellulose acetate prepared in Example 9 was determined by first placing the film under 66 psi stress and slowly heating the film in accordance with ASTM D1637. The temperature at which the film elongates 2% of its length was considered to be the highest, dimensionally stable temperature of that film's formulation. The higher this temperature is the more dimensionally stable the formulation. These temperatures are recorded in Table XIV.

TABLE XIV

Dimensional Stability of Cellulose Acetate, CA-435-75, Formulated with Arylene-bis(diaryl phosphate)s

| Formulation Designation | Example From Which Phosphate Was Derived | Phosphate Concentration (wt. %) | Highest Dimensionally Stable Temperature (°C.) |
|---|---|---|---|
| ab | 2 | 6 | 174 |
| ac | 2 | 12 | 168 |

TABLE XIV-continued

Dimensional Stability of Cellulose Acetate, CA-435-75,
Formulated with Arylene-bis(diaryl phosphate)s

| Formulation Designation | Example From Which Phosphate Was Derived | Phosphate Concentration (wt. %) | Highest Dimensionally Stable Temperature (°C.) |
| --- | --- | --- | --- |
| ad | 2 | 20 | 149 |
| ag | 3 | 6 | 175 |
| ah | 3 | 12 | 164 |
| ai | 3 | 20 | 160 |
| al | 4 | 6 | 175 |
| am | 4 | 12 | 159 |
| an | 4 | 20 | 135 |
| aq | 5 | 6 | 178 |
| ar | 5 | 12 | 168 |
| as | 5 | 20 | 147 |
| av | 8 | 6 | 179 |
| aw | 8 | 12 | 170 |
| ax | 8 | 20 | 148 |
| ba | 6 | 6 | 183 |
| bb | 6 | 12 | 172 |
| bc | 6 | 20 | 151 |
| bf | 7 | 6 | 179 |
| bg | 7 | 12 | 172 |
| bh | 7 | 20 | 146 |

EXAMPLE 15 (Comparative)

The dimensional stability of the film of cellulose acetate prepared in comparative Example 10 was determined by the same method as that described in Example 14. This temperature is recorded in Table XV.

TABLE XV

Dimensional Stability of Cellulose Acetate, CA-435-75,
Formulated without any Phosphate Additive

| Formulation Designation | Example From Which Phosphate Was Derived | Phosphate Concentration (wt. %) | Highest Dimensionally Stable Temperature (°C.) |
| --- | --- | --- | --- |
| zw | none | 0 | 199 |

EXAMPLE 16 (Comparative)

The performance of triaryl phosphate as a dimensional stabilizer of the films of cellulose acetate prepared in comparative Example 10 was determined by the same method as that described in Example 14. These temperatures are recorded in Table XVI.

TABLE XVI

Dimensional Stability of Cellulose Acetate, CA-435-75,
Formulated with Triphenyl Phosphate

| Formulation Designation | Example From Which Phosphate Was Derived | Phosphate Concentration (wt. %) | Highest Dimensionally Stable Temperature (°C.) |
| --- | --- | --- | --- |
| cb | 1 | 6 | 164 |
| cc | 1 | 12 | 155 |
| cd | 1 | 20 | 132 |

EXAMPLE 17

The performance of arylene-bis(diaryl phosphate)s as flame-retarders for the films of cellulose acetate prepared in Example 9 was measured by the percentage of the weight of the film remaining after the film had been heated to 400° C. at a rate of 20° C. per minute in a stream of air. Higher values of this residual weight indicate better performance as flame retarders. These percentages are recorded in Table XVII.

TABLE XVII

Flame Retardation of Cellulose Acetate, CA-435-75,
Formulated with Arylene-bis(diaryl Phosphate)s

| Formulation Designation | Example From Which Phosphate Was Derived | Phosphate Concentration (wt. %) | Weight % Residue After Heating to 400° C. in Air |
| --- | --- | --- | --- |
| ab | 2 | 6 | 19 |
| ac | 2 | 12 | 20 |
| ad | 2 | 20 | 21 |
| ae | 2 | 30 | 28 |
| ag | 3 | 6 | 21 |
| ah | 3 | 12 | 25 |
| ai | 3 | 20 | 30 |
| aj | 3 | 30 | 40 |
| av | 8 | 6 | 20 |

TABLE XVII-continued

Flame Retardation of Cellulose Acetate, CA-435-75, Formulated with Arylene-bis(diaryl Phosphate)s

| Formulation Designation | Example From Which Phosphate Was Derived | Phosphate Concentration (wt. %) | Weight % Residue After Heating to 400° C. in Air |
|---|---|---|---|
| aw | 8 | 12 | 22 |
| ax | 8 | 20 | 28 |
| ay | 8 | 30 | 47 |
| bf | 7 | 6 | 20 |
| bg | 7 | 12 | 21 |
| bh | 7 | 20 | 28 |
| bi | 7 | 30 | 33 |

EXAMPLE 18 (Comparative)

The flame-retardation of the film of cellulose acetate without any phosphate additive as described in Example 10 was measured by the method described in Example 17. The percentage of film remaining is reported in Table XVIII.

TABLE XVIII

Flame Retardation of Cellulose Acetate, CA-435-75, Formulated without any Phosphate Additives

| Formulation Designation | Example From Which Phosphate Was Derived | Phosphate Concentration (wt. %) | Weight % Residue After Heating to 400° C. in Air |
|---|---|---|---|
| zw | None | 0 | 15 |

EXAMPLE 19 (Comparative)

The performance of triaryl phosphate as a flame retarder for the films of cellulose acetate prepared in comparative Example 11 was measured by a method similar to that described in Example 17. The percentages of film remaining after the test are recorded in Table XIX.

TABLE XIX

Examples of Flame Retardation of Cellulose Acetate, CA-435-75, Formulated with Triphenyl Phosphate

| Formulation Designation | Example From Which Phosphate Was Derived | Phosphate Concentration (wt. %) | Weight % Residue After Heating to 400° C. in Air |
|---|---|---|---|
| cb | 1 | 6 | 16 |
| cc | 1 | 12 | 15 |
| cd | 1 | 20 | 22 |
| ce | 1 | 30 | 12 |

EXAMPLE 20

The cellulose ester used to make the film-forming formulations for this example was cellulose diacetate, CA-398-30, which had a degree of acetyl substitution of 2.45 and an IV in 60/40, weight/weight, phenol/tetrachloroethane of 1.4 dL/g measured at 25° C. at a concentration of 0.5 g polymer per 100 ml solvent. The amounts of phosphate used in the formulations were calculated to give the weight percent phosphate concentrations in the final film that are specified in Table XX. The films were made by a method that was essentially the same as that used in Example 9. The thermal transitions and clarity were determined by a method that was essentially the same as Example 9 and are recorded in Table XX.

TABLE XX

Clarity and Thermal Transitions of Cellulose Diacetate, CA-398-30, Formulated with Varying Levels of an Arylene-bis(diaryl Phosphate)

| Formulation Designation | Phosphate Source (Example) | Phosphate Concentration (wt. %) | Glass Transition Temperature (°C.) | Melting Temperature (°C.) | Clarity |
|---|---|---|---|---|---|
| mb | 2 | 6 | 168 | 213 | Clear |
| mc | 2 | 12 | 145 | 205 | " |
| md | 2 | 20 | 138 | none detected | " |
| me | 2 | 30 | 127 | none detected | " |

EXAMPLE 21 (Comparative)

The film for this example was prepared from cellulose diacetate, CA-398-30, which was described in Example 20. The procedure used to make the films was similar to that described in Example 10. The thermal transitions of the films were determined by the method described in Example 9 and are reported in Table XXI.

TABLE XXI

Clarity and Thermal Transitions of Cellulose Diacetate, CA-398-30, Formulated with Varying Levels of an Arylene-bis(diaryl Phosphate)

| Formulation Designation | Phosphate Source (Example) | Phosphate Concentration (wt. %) | Glass Transition Temperature (°C.) | Melting Temperature (°C.) | Clarity |
|---|---|---|---|---|---|
| zx | none | 0 | 187 | 220 | Clear |

EXAMPLE 22 (Comparative)

The films of this example were prepared from cellulose diacetate, CA-398-30, which was described in Example 20. The procedure used to make the film was similar to that described in Example 11. The thermal transitions of the films were determined by the method described in Example 9 and are reported in Table XXII.

TABLE XXII

Clarity and Thermal Transitions of Cellulose Diacetate, CA-398-30, Formulated with Triphenyl Phosphate

| Formulation Designation | Phosphate Source (Example) | Phosphate Concentration (wt. %) | Glass Transition Temperature (°C.) | Melting Temperature (°C.) | Clarity |
|---|---|---|---|---|---|
| nb | 1 | 6 | 166 | 209 | Clear |
| nc | 1 | 12 | 148 | none detected | " |
| nd | 1 | 20 | 138 | none detected | " |
| ne | 1 | 30 | 134 | none detected | " |

EXAMPLE 23

Thermogravimetric analysis was performed as described in Example 12 on films made by the procedure described in Example 20. The temperatures of formulaic stability, at which 2.5 weight % loss had occurred, are recorded in Table XXIII.

TABLE XXIII

Formulaic Stability of Cellulose Acetate, CA-398-30, Formulated with Arylene-bis(diaryl Phosphate)s

| Formulation Designation | Example From Which Phosphate Was Derived | Phosphate Concentration (wt. %) | Thermogravimetric Analysis of the Temperature of Formulaic Stability (°C.) |
|---|---|---|---|
| mc | 2 | 12 | 330 |
| me | 2 | 30 | 310 |
| mg | 3 | 6 | 200 |
| mh | 3 | 12 | 215 |
| mi | 3 | 20 | 200 |
| mj | 3 | 30 | 200 |

EXAMPLE 24 (Comparative)

Thermogravimetric analysis was performed as described in Example 12 on film made by the procedure described in Example 21. The temperature of formulaic stability, at which 2.5 weight % loss had occurred, is recorded in Table XXIV.

TABLE XXIV

Formulaic Stability of Cellulose Diacetate, CA-398-30, Formulated without any Phosphate Additive

| Formulation Designation | Example From Which Phosphate Was Derived | Phosphate Concentration (wt. %) | Thermogravimetric Analysis of the Temperature of Formulaic Stability (°C.) |
|---|---|---|---|
| zx | none | 0 | 210 |

EXAMPLE 25

Thermogravimetric analysis was performed as described in Example 12 on film made by the procedure described in Example 22. The temperatures of formulaic stability, at which 2.5 weight % loss had occurred, are recorded in Table XXV.

TABLE XXV

Formulaic Stability of Cellulose Diacetate, CA-398-30, Formulated with Triphenyl Phosphate

| Formulation Designation | Example From Which Phosphate Was Derived | Phosphate Concentration (wt. %) | Thermogravimetric Analysis of the Temperature of Formulaic Stability (°C.) |
|---|---|---|---|
| nb | 1 | 6 | 210 |
| nc | 1 | 12 | 190 |
| nd | 1 | 20 | 185 |
| ne | 1 | 30 | 225 |

EXAMPLE 26

The dimensional stability of the films of cellulose diacetate prepared by the procedure described in Example 20 was determined by the method described in Example 14. The highest, dimensionally stable temperatures of those films are reported in Table XXVI.

TABLE XXVI

| | Dimensional Stability of Films of Cellulose Diaetate, CA-398-30, Formulated with an Arylene-bis(diaryl Phosphate) | | |
|---|---|---|---|
| Formulation Designation | Example From Which Phosphate Was Derived | Phosphate Concentration (wt. %) | Highest Dimensionally Stable Temperature (°C.) |
| mb | 2 | 6 | 194 |
| mc | 2 | 12 | 180 |
| md | 2 | 20 | 173 |

EXAMPLE 27 (Comparative)

The dimensional stability of the film of cellulose diacetate prepared by the procedure described in Example 21 was determined by the method described in Example 14. The highest dimensionally stable temperatures of those films are reported in Table XXVII.

TABLE XXVII

| | Dimensional Stability of Film of Cellulose Diacetate, CA-398-30, Formulated without a Phosphate Additive | | |
|---|---|---|---|
| Formulation Designation | Example From Which Phosphate Was Derived | Phosphate Concentration (wt. %) | Highest Dimensionally Stable Temperature (°C.) |
| zx | none | 0 | 202 |

EXAMPLE 28 (Comparative)

The dimensional stability of the films of cellulose diacetate prepared by the procedure described in Example 22 was determined by the method described in Example 14. The highest dimensionally stable temperatures of those films are reported in Table XXVIII.

TABLE XXVIII

| | Dimensional Stability of Cellulose Diacetate, CA-398-30, Formulated with Triphenyl Phosphate | | |
|---|---|---|---|
| Formulation Designation | Example From Which Phosphate Was Derived | Phosphate Concentration (wt. %) | Highest Dimensionally Stable Temperature (°C.) |
| nb | 1 | 6 | 184 |
| nc | 1 | 12 | 159 |
| nd | 1 | 20 | 134 |

EXAMPLE 29

Films of cellulose diacetate, CA-398-30, prepared with arylene-bis(diphenyl phosphate)s as described in Example 20 were tested for their flame retardance as described in Example 17. The residues expressed as weight percent are recorded in Table XXIX.

TABLE XXIX

| | Flame Retardation of Cellulose Diacetate, CA-398-30, Formulated with Arylene-bis(diaryl Phosphate)s | | |
|---|---|---|---|
| Formulation Designation | Example From Which Phosphate Was Derived | Phosphate Concentration (wt. %) | Weight % Residue After Heating to 400° C. in Air |
| mb | 2 | 6 | 21 |
| mc | 2 | 12 | 24 |
| md | 2 | 20 | 23 |
| me | 2 | 30 | 20 |
| mg | 3 | 6 | 20 |
| mh | 3 | 12 | 24 |
| mi | 3 | 20 | 28 |
| mj | 3 | 30 | 40 |

EXAMPLE 30 (Comparative)

Film of cellulose diacetate, CA-398-30, prepared without any phosphate additive, as described in Example 21, was tested for their flame retardance as described in Example 17. The residue expressed as weight percent is recorded in Table XXX.

TABLE XXX

| | Flame Retardation of Cellulose Diacetate, CA-398-30, Formulated without any Phosphate Additive | | |
|---|---|---|---|
| Formulation Designation | Example From Which Phosphate Was Derived | Phosphate Concentration (wt. %) | Weight % Residue After Heating to 400° C. in Air |
| zx | none | 0 | 15 |

EXAMPLE 31 (Comparative)

Films of cellulose diacetate, CA-398-30, prepared with triphenyl phosphate, as described in Example 22, were tested for their flame retardance as described in Example 17. The residues expressed as weight percent are recorded in Table XXXI.

TABLE XXXI

| | Flame Retardation of Cellulose Diacetate, CA-398-30, Formulated with Triphenyl Phosphate | | |
|---|---|---|---|
| Formulation Designation | Example From Which Phosphate Was Derived | Phosphate Concentration (wt. %) | Weight % Residue After Heating to 400° C. in Air |
| nb | 1 | 6 | 12 |
| nc | 1 | 12 | 15 |
| nd | 1 | 20 | 14 |
| ne | 1 | 30 | 10 |

EXAMPLE 32

The cellulose ester used to make the film-forming formulations for this example was cellulose acetate propionate, CAP-482-20, which had a degree of acetyl substitution of 0.03, a degree of propionyl substitution of 2.68 and an IV in 60/40, weight/weight, phenol/tetrachloroethane of 1.4 dL/g measured at 25° C. at a concentration of 0.5 g polymer per 100 ml solvent. The amounts of phosphate used in the formulations were calculated to give the weight percent phosphate concentrations in the final film that are specified in Table XXXII. The films were made by a method that was essentially the same as that used in Example 9. The thermal transitions were determined by the method described in Example 9 and are recorded in Table XXXII.

TABLE XXXII

| | Clarity and Thermal Transitions of Cellulose Acetate Propionate, CAP-482-20, Formulated with an Arylene-bis(diaryl phosphate)s | | | | |
|---|---|---|---|---|---|
| Formulation Designation | Phosphate Source (Example) | Phosphate Concentration (wt. %) | Glass Transition Temperature (°C.) | Melting Temperature (°C.) | Clarity |
| ob | 2 | 6 | 134 | 179 | Clear |
| oc | 2 | 12 | 118 | 174 | " |
| od | 2 | 20 | 110 | none detected | " |
| oe | 2 | 30 | 108 | none detected | " |

EXAMPLE 33 (Comparative)

Film with no phosphate additive was made from cellulose acetate propionate, CAP-482-20, which was described in Example 32. The procedure used for making the film was similar to that used in Example 21. The clarity and thermal transitions of this film were determined by the technique described in Example 9 and these temperatures are recorded in Table XXXIII.

TABLE XXXIII

| | Clarity and Thermal Transitions of Cellulose Acetate Propionate, CAP-482-20, Formulated without any Phosphate Additive | | | | |
|---|---|---|---|---|---|
| Formulation Designation | Phosphate Source (Example) | Phosphate Concentration (wt. %) | Glass Transition Temperature (°C.) | Melting Temperature (°C.) | Clarity |
| zy | none | 0 | 141 | 190 | Clear |

EXAMPLE 34 (Comparative)

Films from cellulose acetate propionate, CAP-482-20, which was described in Example 32, were formulated with a triaryl phosphate by the method described in Example 11. The thermal transitions were determined by the method described in Example 9 and are recorded in Table XXXIV.

TABLE XXXIV

| | Clarity and Thermal Transitions of Cellulose Acetate Propionate, CAP-482-20, Formulated with Triphenyl Phosphate | | | | |
|---|---|---|---|---|---|
| Formulation Designation | Phosphate Source (Example) | Phosphate Concentration (wt. %) | Glass Transition Temperature (°C.) | Melting Temperature (°C.) | Clarity |
| pb | 1 | 6 | 131 | 179 | Clear |

TABLE XXXIV-continued

Clarity and Thermal Transitions of Cellulose Acetate Propionate, CAP-482-20, Formulated with Triphenyl Phosphate

| Formulation Designation | Phosphate Source (Example) | Phosphate Concentration (wt. %) | Glass Transition Temperature (°C.) | Melting Temperature (°C.) | Clarity |
|---|---|---|---|---|---|
| pc | 1 | 12 | 129 | None | " |
| pd | 1 | 20 | 121 | None | " |
| pe | 1 | 30 | 114 | None | " |

EXAMPLE 35

Thermogravimetric analysis was performed as described in Example 12 on films made by the procedure described in Example 32. The temperatures of formulaic stability, at which 2.5 weight % loss had occurred, are recorded in Table XXXV.

TABLE XXXV

Formulaic Stability of Cellulose Acetate Propionate, CAP-482-20, Formulated with Arylene-bis(diaryl Phosphate)s

| Formulation Designation | Example From Which Phosphate Was Derived | Phosphate Concentration (wt. %) | Thermogravimetric Analysis of the Temperature of Formulaic Stability (°C.) |
|---|---|---|---|
| ob | 2 | 6 | 340 |
| oc | 2 | 12 | 330 |
| od | 2 | 20 | 330 |
| oe | 2 | 30 | 335 |
| og | 3 | 6 | 330 |
| oh | 3 | 12 | 330 |
| oi | 3 | 20 | 340 |
| oj | 3 | 30 | 330 |

EXAMPLE 36 (Comparative)

Thermogravimetric analysis was performed as described in Example 12 on film made by the procedure described in Example 33. The temperature of formulaic stability, at which 2.5 weight % loss had occurred, is recorded in Table XXXVI.

TABLE XXXVI

Formulaic Stability of Cellulose Acetate Propionate, CAP-482-20, Formulated without any Phosphate Additive

| Formulation Designation | Example From Which Phosphate Was Derived | Phosphate Concentration (wt. %) | Thermogravimetric Analysis of the Temperature of Formulaic Stability (°C.) |
|---|---|---|---|
| zy | none | 0 | 325 |

EXAMPLE 37 (Comparative)

Thermogravimetric analysis was performed as described in Example 12 on film made by the procedure described in Example 32 except that triaryl phosphate of Example 1 was substituted for arylene-bis(diaryl phosphate). The temperatures for formulaic stability, at which 2.5 weight % loss had occurred, are recorded in Table XXXVII.

TABLE XXXVII

Formulaic Stability of Cellulose Acetate Propionate, CAP-482-20, Formulated with Triphenyl Phosphate

| Formulation Designation | Example From Which Phosphate Was Derived | Phosphate Concentration (wt. %) | Thermogravimetric Analysis of the Temperature of Formulaic Stability (°C.) |
|---|---|---|---|
| ob | 1 | 6 | 300 |
| od | 1 | 20 | 275 |
| oe | 1 | 30 | 260 |

EXAMPLE 38

The dimensional stability of the films of cellulose acetate propionate prepared by the procedure described in Example 32 was determined by the method described in Example 14. The highest, dimensionally stable temperatures of those films are reported in Table XXXVIII.

TABLE XXXVIII

Dimensional Stability of Cellulose Acetate Propionate, CAP-482-20, Formulated with Arylene-bis(diaryl phosphate)s

| Formulation Designation | Example From Which Phosphate Was Derived | Phosphate Concentration (wt. %) | Highest Dimensionally Stable Temperature (°C.) |
|---|---|---|---|
| ob | 2 | 6 | 148 |
| oc | 2 | 12 | 144 |
| od | 2 | 20 | 137 |

EXAMPLE 39 (Comparative)

The dimensional stability of the film of cellulose acetate propionate prepared by the procedure described in Example 33 was determined by the method described in Example 14. The highest, dimensionally stable temperature of that film is reported in Table XXXIX.

TABLE XXXIX

Dimensional Stability of Cellulose Acetate Propionate, CAP-482-20, Formulated without a Phosphate Additive

| Formulation Designation | Example From Which Phosphate Was Derived | Phosphate Concentration (wt. %) | Highest Dimensionally Stable Temperature (°C.) |
|---|---|---|---|
| zy | none | 0 | 181 |

EXAMPLE 40 (Comparative)

The dimensional stability of the films of cellulose acetate propionate prepared by the procedure described in example 34 was determined by the method described in Example 14. The highest, dimensionally stable temperatures of those films are reported in Table XL.

TABLE XL

Dimensional Stability of Cellulose Acetate Propionate, CAP-482-20, Formulated with Triphenyl Phosphate

| Formulation Designation | Example From Which Phosphate Was Derived | Phosphate Concentration (wt. %) | Highest Dimensionally Stable Temperature (°C.) |
|---|---|---|---|
| pb | 1 | 6 | 149 |
| pc | 1 | 12 | 118 |
| pd | 1 | 20 | 112 |

EXAMPLE 41

Films of cellulose acetate propionate, CAP-482-20, prepared with arylene-bis(diphenyl phosphate)s as described in Example 32 were tested for their flame-retardance as described in Example 17. The residues expressed in weight percent are recorded in Table XLI.

TABLE XLI

Flame Retardation of Cellulose Acetate Propionate, CAP-482-20, Formulated with Arylene-bis(diaryl Phosphate)s

| Formulation Designation | Example From Which Phosphate Was Derived | Phosphate Concentration (wt. %) | Weight % Residue After Heating to 400° C. in Air |
|---|---|---|---|
| ob | 2 | 6 | 18 |
| oc | 2 | 12 | 20 |
| od | 2 | 20 | 23 |
| oe | 2 | 30 | 28 |
| og | 3 | 6 | 19 |
| oh | 3 | 12 | 21 |
| oi | 3 | 20 | 29 |
| oj | 3 | 30 | 35 |

EXAMPLE 42 (Comparative)

Film of cellulose acetate propionate, CAP-482-20, prepared without any phosphate additive, as described in Example 33, was tested for flame retardance as described in Example 17. The residue expressed as weight percent is recorded in Table XLII.

TABLE XLII

Flame Retardation of Cellulose Acetate Propionate, CAP-482-20, Formulated without any Phosphate Additive

| Formulation Designation | Example From Which Phosphate Was Derived | Phosphate Concentration (wt. %) | Weight % Residue After Heating to 400° C. in Air |
|---|---|---|---|
| zy | none | 0 | 20 |

EXAMPLE 43 (Comparative)

Films of cellulose acetate propionate, CAP-482-20, prepared with a triaryl phosphate, as described in Example 33, were tested for their flame retardance as described in Example 17. The residue expressed as weight percent is recorded in Table XLIII.

TABLE XLIII

Flame Retardation of Cellulose Acetate Propionate, CAP-482-20, Formulated with Triphenyl Phosphate

| Formulation Designation | Example From Which Phosphate Was Derived | Phosphate Concentration (wt. %) | Weight % Residue After Heating to 400° C. in Air |
|---|---|---|---|
| pb | 1 | 6 | 15 |
| pd | 1 | 20 | 14 |
| pe | 1 | 30 | 14 |

EXAMPLE 44

The cellulose ester used to make the film-forming formulations for this example was cellulose acetate butyrate, CAP-381-20, which had a degree of acetyl substitution of 1.05, a degree of butyryl substitution of 1.71 and an IV in 60/40, weight/weight, phenol/tetrachloroethane of 1.4 dL/g as measured at 25° C. at a concentration of 0.5 g polymer per 100 ml solvent. The amounts of phosphate used in the formulations were calculated to give the weight percent phosphate concentrations in the final film that are specified in Table XLIV. The films were made by a method that was essentially the same as that used in Example 9. The thermal transitions and clarity were determined as described in Example 9 and are recorded in Table XLIV.

TABLE XLIV

Clarity and Thermal Transitions of Cellulose Acetate Butyrate, CAB-381-20, Formulated with an Arylene-bis(diaryl Phosphate)

| Formulation Designation | Phosphate Source (Example) | Phosphate Concentration (wt. %) | Glass Transition Temperature (°C.) | Melting Temperature (°C.) | Clarity |
|---|---|---|---|---|---|
| qb | 2 | 6 | 120 | 154 | Clear |
| qc | 2 | 12 | 109 | 143 | " |
| qd | 2 | 20 | 92 | 136 | " |
| qe | 2 | 30 | 78 | none detected | " |

EXAMPLE 45 (Comparative)

Film with no phosphate additive was made from cellulose acetate butyrate, CAP-381-20, which was described in Example 44. The procedure used for making the film was that used in Example 21. The thermal transitions and clarity of that film were determined by the technique described in Example 9 and those temperatures are recorded in Table XLV.

TABLE XLV

Example of Film of Cellulose Acetate Butyrate, CAB-381-20, Formulated without Any Phosphate Additive

| Formulation Designation | Phosphate Source (Example) | Phosphate Concentration (wt. %) | Glass Transition Temperature (°C.) | Melting Temperature (°C.) | Clarity |
|---|---|---|---|---|---|
| zz | none | 0 | 139 | 171 | Clear |

EXAMPLE 46 (Comparative)

Films from cellulose acetate butyrate, CAB-381-20, which were formulated with triaryl phosphate were prepared by the method described in Example 44 except that triphenyl phosphate was substituted for the arylene-bis(diaryl phosphate). The thermal transitions and clarity were determined by the method described in Example 9 and are recorded in Table XLVI.

TABLE XLVI

Clarity and Thermal Transitions of Cellulose Acetate Butyrate, CAB-381-20, Formulated with Triphenyl Phosphate

| Formulation Designation | Phosphate Source (Example) | Phosphate Concentration (wt. %) | Glass Transition Temperature (°C.) | Melting Temperature (°C.) | Clarity |
|---|---|---|---|---|---|
| rb | 1 | 6 | 112 | 154 | Clear |
| rc | 1 | 12 | 109 | 139 | " |
| rd | 1 | 20 | 83 | 120 | " |
| re | 1 | 30 | 80 | none detected | " |

EXAMPLE 47

Thermogravimetric analysis was performed as described in Example 12 on films which were made by the procedure described in Example 44. The temperatures of formulaic stability, at which 2.5 weight % loss had occurred, are recorded in Table XLVII.

TABLE XLVII

Formulaic Stability of Cellulose Acetate Butyrate, CAB-381-20,
Formulated with an Arylene-bis(diaryl Phosphate)

| Formulation Designation | Example From Which Phosphate Was Derived | Phosphate Concentration (wt. %) | Thermogravimetric Analysis of the Temperature of Formulaic Stability (°C.) |
|---|---|---|---|
| qb | 2 | 6 | 325 |
| qc | 2 | 12 | 330 |
| qd | 2 | 20 | 330 |
| qe | 2 | 30 | 335 |

EXAMPLE 48 (Comparative)

Thermogravimetric analysis was performed as described in Example 12 on film made by the procedure described in Example 45. The temperature of formulaic stability, at which 2.5 weight % loss had occurred, is recorded in Table XLVIII.

TABLE XLVIII

Formulaic Stability of Cellulose Acetate Butyrate, CAB-381-20,
Formulated without any Phosphate Additive

| Formulation Designation | Example From Which Phosphate Was Derived | Phosphate Concentration (wt. %) | Thermogravimetric Analysis of the Temperature of Formulaic Stability (°C.) |
|---|---|---|---|
| zz | none | 0 | 320 |

EXAMPLE 49 (Comparative)

Thermogravimetric analysis was performed as described in Example 12 on film made by the procedure described in Example 46. The temperatures of formulaic stability, at which 2.5 weight % loss had occurred, are recorded in Table IL.

TABLE IL

Formulaic Stability of Cellulose Acetate Butyrate, CAB-381-20,
Formulated with Triphenyl Phosphate

| Formulation Designation | Example From Which Phosphate Was Derived | Phosphate Concentration (wt. %) | Thermogravimetric Analysis of the Temperature of Formulaic Stability (°C.) |
|---|---|---|---|
| qb | 1 | 6 | 280 |
| qc | 1 | 12 | 275 |
| qd | 1 | 20 | 255 |
| qe | 1 | 30 | 250 |

EXAMPLE 50

The dimensional stability of the films of cellulose acetate butyrate prepared by the procedure described in Example 44 was determined by the method described in Example 14. The highest, dimensionally stable temperatures of those films are reported in Table L.

TABLE L

Dimensional Stability of Cellulose Acetate Butyrate, CAB-381-20,
Formulated with Arylene-bis(diaryl Phosphate)s

| Formulation Designation | Example From Which Phosphate Was Derived | Phosphate Concentration (wt. %) | Highest Dimensionally Stable Temperature (°C.) |
|---|---|---|---|
| qc | 2 | 12 | 122 |
| qd | 2 | 20 | 95 |
| qe | 2 | 30 | 72 |

EXAMPLE 51 (Comparative)

The dimensional stability of the film of cellulose acetate butyrate prepared by the procedure described in Example 45 was determined by the method described in Example 14. The highest, dimensionally stable temperature of that film is reported in Table LI.

TABLE LI

Dimensional Stability of Cellulose Acetate Butyrate, CAB-381-20,
Formulated without a Phosphate Additive

| Formulation Designation | Example From Which Phosphate Was Derived | Phosphate Concentration (wt. %) | Highest Dimensionally Stable Temperature (°C.) |
|---|---|---|---|
| zz | none | 0 | 156 |

EXAMPLE 52 (Comparative)

The dimensional stability of the films of cellulose acetate butyrate prepared by the procedure described in Example 46 was determined by the method described in Example 14. The highest, dimensionally stable temperatures of those films are reported in Table LII.

TABLE LII

Dimensional Stability of Cellulose Acetate Butyrate, CAB-381-20, Formulated with Triphenyl Phosphate

| Formulation Designation | Example From Which Phosphate Was Derived | Phosphate Concentration (wt. %) | Highest Dimensionally Stable Temperature (°C.) |
|---|---|---|---|
| rc | 1 | 12 | 113 |
| rd | 1 | 20 | 90 |
| re | 1 | 30 | 64 |

EXAMPLE 53

Films of cellulose acetate butyrate, CAB-381.20, prepared with arylene-bis(diphenyl phosphate) as described in Example 44 were tested for their flame retardance as described in Example 17. The residues expressed as weight percent are recorded in Table LIII.

TABLE LIII

Flame Retardation of Cellulose Acetate Butyrate, CAB-381-20, Formulated with an Arylene-bis(diaryl phosphate)

| Formulation Designation | Example From Which Phosphate Was Derived | Phosphate Concentration (wt. %) | Weight % Residue After Heating to 400° C. in Air |
|---|---|---|---|
| qb | 2 | 6 | 16 |
| qc | 2 | 12 | 18 |
| qd | 2 | 20 | 20 |
| qe | 2 | 30 | 22 |

EXAMPLE 54 (Comparative)

Film of cellulose acetate butyrate, CAB-381-20, prepared without any phosphate additive, as described in Example 45, was tested for flame retardance as described in Example 17. The residue expressed as weight percent is recorded in Table LIV.

TABLE LIV

Flame Retardation of Cellulose Acetate Butyrate, CAB-381-20, Formulated without Any Phosphate Additive

| Formulation Designation | Example From Which Phosphate Was Derived | Phosphate Concentration (wt. %) | Weight % Residue After Heating to 400° C. in Air |
|---|---|---|---|
| zz | none | 0 | 16 |

EXAMPLE 55 (Comparative)

Films of cellulose acetate butyrate, CAB-381-20, prepared with a triaryl phosphate, as described in Example 46, were tested for their flame-retardance as described in Example 17. The residues expressed as weight percent are recorded in Table LV.

TABLE LV

Flame Retardation of Films of Cellulose Acetate Butyrate, CAB-381-20, Formulated with Triphenyl Phosphate

| Formulation Designation | Example From Which Phosphate Was Derived | Phosphate Concentration (wt. %) | Weight % Residue After Heating to 400° C. in Air |
|---|---|---|---|
| rb | 1 | 6 | 13 |
| rc | 1 | 12 | 14 |
| rd | 1 | 20 | 11 |
| re | 1 | 30 | 10 |

EXAMPLE 56

The cellulose acetate used in this example had the same chemical composition as the cellulose acetate described in Example 20. Concentrate A was made up in the following manner from this cellulose acetate, CA-398-30. First a solution of 56.75 grams of epoxidized tall oil, 45.4 grams of para-tertiary-butyl phenol, 7.95 grams of neopentylphenyl phosphite and 2.27 grams of 50 weight % strontium naphthenate in mineral oil was made by dissolving all four components in 2000 ml of ethanol. Then 1 pound of CA-398-30 was slurried in this solution and the ethanol was removed by rotary evaporation under 15 inches of Hg vacuum at 60° C. and 80 revolutions per minute. The residue which remained after removal of the isopropyl alcohol was Concentrate A. Concentrate A was added to 48 pounds of cellulose acetate, CA-398-30, and this mixture was blended with 9 pounds of p-phenylene bis(diphenyl phosphate) from Example 2. This blend was then compounded as a melt in a twin-screw extruder with barrel and die temperatures of 230° C. and screw speed of 275 rpm. The extrudate was chopped into pellets which were less than 0.5 inches in length, width and height. These pellets represent the formulation of the cellulose acetate, CA-398-30 with 18 parts of p-phenylene bis(diphenyl phosphate) per hundred parts of CA-398-30 and with 0.6 parts of epoxidized tall oil per hundred parts of CA-398-30 and with 0.4 parts of para-tertiary-butyl phenol per hundred parts of CA-398-30 and with 0.07 parts of neopentylphenyl phosphite per hundred parts of CA-398-30 and with 0.02 parts of 50 weight % strontium naphthenate in mineral oil per 100 parts of CA-398-30. These pellets were then dried for 16 hours at 70° C. and extruded into film on a single screw extruder. The barrel and die temperatures of the extruder were 245° C. The resulting film had a thickness of 4 mils with the properties given in Table LVI.

TABLE LVI

Properties of Cellulose Acetate, CA-398-30, Formulated with an Arylene-bis(diphenyl phosphate), 1,4-phenylene-bis(diphenyl phosphate) and Extruded into Film

| Property | Method From Example | Value |
|---|---|---|
| Tg | 9 | 153 |
| Tm | 9 | none detected |
| Highest Dimensionally Stable Temperature | 14 | 140 |

EXAMPLE 57

Concentrate B was made up in the following manner from CA-398-30 with the same chemical characteristics as that described in Example 56. First a solution of 65.8 grams of epoxidized tall oil, 52.7 grams of para-tertiary-butyl phenol, 9.2 grams of neopentylphenyl phosphite and 2.6 grams of 50 weight % strontium naphthenate in mineral oil was made by dissolving all four components in 2000 ml of ethanol. Then 500 grams of CA-398-30 was slurried in this solution and the ethanol was removed by rotary evaporation under 20 inches of Hg vacuum at 60° C. and 80 revolutions per minute. The residue which remained after removal of the isopropyl alcohol was Concentrate B. Concentrate C was made by thoroughly mixing 1317 grams of polyethylene glycol with a molecular weight in the range from 380 to 420 with 1500 grams of CA-398-30 until a uniform, white, freely flowing powder resulted. Then Concentrate B and Concentrate C were added to 11.35 kilograms of CA-398-30 and 790 grams of p-phenylene bis(diphenyl phosphate) from Example 2. This mixture of powders was blended vigorously for four hours. The blend was then compounded as a melt in a twin-screw extruder with barrel and die temperatures of 225° C. and screw speed of 275 rpm. The extrudate was chopped into pellets which were less than 0.5 inches in length, width and height. These pellets represent the formulation of the cellulose acetate, CA-398-30 with 6 parts of p-phenylene bis(diphenyl phosphate) per hundred parts of CA-398-30 and with 10 parts of polyethylene glycol per hundred parts of CA-398-30 and with 0.6 parts of epoxidized tall oil per hundred parts of CA-398-30 and with 0.4 parts of para-tertiary-butyl phenol per hundred parts of CA-398-30 and with 0.07 parts of neopentylphenyl phosphite per 100 parts of CA-398-30 and with 0.02 parts of 50 weight % strontium naphthenate ion mineral oil per 100 parts of CA-398-30. These pellets were then dried for 16 hours at 70° C. and extruded into film on a single screw extrude. The barrel and die temperatures of the extruder were 245° C. The resulting film had a thickness of 4 mils with the properties given in Table LVII.

TABLE LVII

Properties of Cellulose Acetate, CA-398-30, Formulated with an Arylene-bis(diphenyl phosphate), 1,4-phenylene-bis(diphenyl phosphate) and Extruded into Film

| Property | Method From Example | Value |
|---|---|---|
| Tg | 9 | 139 |
| Tm | 9 | 195 |
| Highest Dimensionally Stable Temperature | 14 | 134 |

The invention has been described in detail with particular reference to preferred embodiments thereof, but it will be understood that variations and modifications can be effected within the spirit and scope of the invention.

We claim:

1. A blend comprising
   (A) at least one cellulose ester, and
   (B) 6 to about 30 percent, based on the weight of component (A), of at least one arylene--bis(diaryl phosphate) compound.

2. The blend of claim 1 wherein component (B) is present in an amount of about 10 to about 30%, based on the weight of component (A).

3. The blend of claim 1 wherein component (B) is present in an amount of about 10 to about 24%, based on the weight of component (A).

4. The blend of claim 1 further comprising about 0.05 to about 45% of one or more other additives selected from the group consisting of thermal stabilizers, antioxidants, acid scavengers, ultraviolet light stabilizers, colorants, other plasticizers, and stripping aids based on the weight of component (A).

5. The blend of claim 4 wherein said other additives are selected from the group consisting of triazoles, monobenzoates, isocyanurates, phosphites, derivatives of phenol, naphthanoates, epoxidized tallates, epoxidized oils, hindered amines, dimethyl phthalate, diethyl phthalate, triethyl phosphate, triphenyl phosphate, triethyl citrate, dibutyl sebacate, methoxymethyl phthalate, di-(2-methoxyethyl) phthalate, and mono- and di-substituted polyethoxylated and mono- and di-substituted phosphate esters with one or more of the non-esterified hydroxyl groups in the free acid form.

6. The blend of claim 4 wherein said other additives are selected from the group consisting of:
   (i) about 8 to about 35% of other plasticizers, stripping aids, or a mixture thereof, based on the weight of component (A),
   (ii) about 0.05 to about 4% of thermal stabilizers, antioxidants, acid scavengers, ultraviolet light stabilizers, colorants, or a mixture thereof, based on the weight of component (A), and
   (iii) a combination of (i) and (ii).

7. The blend of claim 4 wherein said other additives are selected from the group consisting of:
   (i) about 18 to about 26% of other plasticizers, stripping aids, or a mixture thereof, based on the weight of component (A),
   (ii) about 0.1 to about 12.5% of thermal stabilizers, antioxidants, acid scavengers, ultraviolet light stabilizers, colorants, or a mixture thereof, based on the weight of component (A), and
   (iii) a combination of (i) and (ii).

8. The blend of claim 1 wherein said cellulose ester contains substituents selected from $C_2$-$C_8$ alkanoyl, $C_7$ aroyl, or a mixture thereof.

9. The blend of claim 1 wherein said cellulose ester is cellulose acetate, cellulose propionate, cellulose butyrate, cellulose acetate propionate, cellulose acetate butyrate, or cellulose propionate butyrate.

10. The blend of claim 9 wherein the DS per AGU for acetyl is 0 to about 2.9, for butyryl is 0 to about 2.6, for propionyl is 0 to about 2.7, and for residual hydroxyl groups ia bout 0.3 to about 0.9.

11. The blend of claim 10 wherein component (B) is of the structure

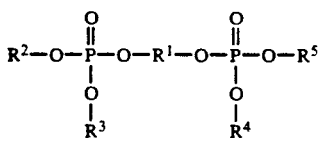

wherein R¹ is

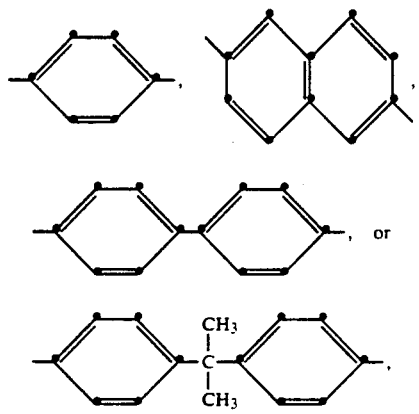

and each of $R^2$, $R^3$, $R^4$ and $R^5$ is of the formula

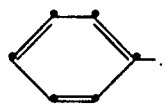

12. A film or molded object comprising the blend of claim 11.

13. The blend of claim 9 wherein component (A) has an ASTM D-871 viscosity of about 10 to about 60 seconds.

14. The blend of claim 9 wherein component (B) is p- or m-phenylene bis(diphenyl phosphate); 1,6- or 2,7-naphthylene bis(diphenyl phosphate); p- or m-phenylene bis((di-chlorophenyl) phosphate); 1,6- or 2,7-naphthylene bis((di-chlorophenyl) phosphate); p- or m-phenylene bis((di-methoxyphenyl) phosphate);p or 1,6- or 2,7-naphthylene bis((di-methoxyphenyl) phosphate).

15. The blend of claim 9 wherein component (B) is of the structure

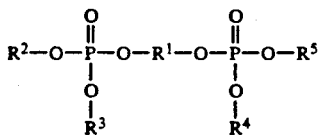

wherein R¹ is

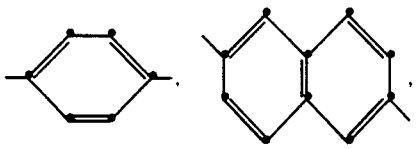

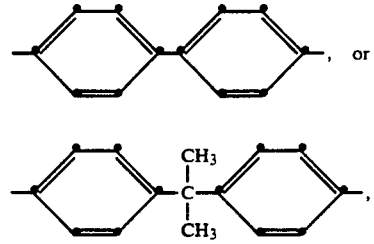

and each of $R^2$, $R^3$, $R^4$ and $R^5$ is of the formula

16. A film or molded object comprising the blend of claim 15.

17. A film or molded object comprising the blend of claim 9.

18. The blend of claim 1 wherein the DS per AGU of residual hydroxyl groups ia bout 0.1 to about 2.0, and wherein said blend has an I.V. of about 1.4 to about 1.9 dL/g as measured in a 60/40 by weight phenol/tetrachloroethane solvent at 25° C. at a concentration of 0.5 g of cellulose ester per 100 ml of solvent.

19. The blend of claim 1 wherein component (A) is cellulose acetate having a DS per AGU of acetyl groups of about 2.1 to about 2.9.

20. The blend of claim 19 wherein component (B) is of the structure

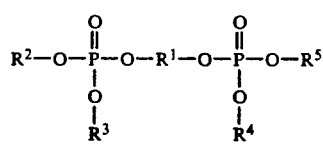

wherein R¹ is

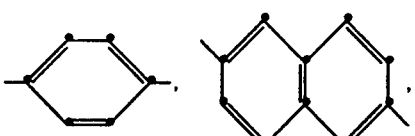
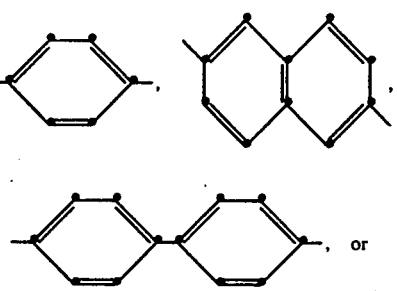

-continued

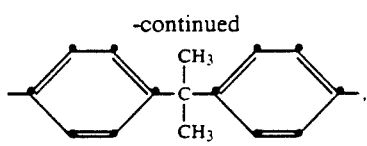

and each of $R^2$, $R^3$, $R^4$ and $R^5$ of the formula

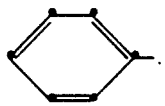

21. A film or molded object comprising the blend of claim 20.

22. The blend of claim 19 which:
(a) retains 15% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;
(b) has a glass transition temperature less than 175° C. when measured in accordance with ASTM Procedure D-3418 modified to heat the sample at a rate of 20° C. per minute on a DuPont Autosampler Dual Cell 912;
(c) retains 97.5% of its initial weight after being heated to 175° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;
(d) has less than 2% elongation when heated to 130° C. when measured in accordance with ASTM Procedure D-1637 on blends made into films that are from 10 to 14 cm long, 2.5 to 3 cm wide and 0.1 to 0.2 mm thick; and
(e) can be made into articles by solvent-casting or extrusion which are free of haze by visual inspection under fluorescent lights.

23. The blend of claim 19 which:
(a) retains 18% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;
(b) has a glass transition temperature less than 170° C. when measured in accordance with ASTM Procedure D-3418 modified to heat the sample at a rate of 20° C. per minute on a DuPont Autosampler Dual Cell 912;
(c) retains 97.5% of its initial weight after being heated to 200° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;
(d) has less than 2% elongation when heated to 130° C. when measured in accordance with ASTM Procedure D-1637 on blends made into films that are from 10 to 14 cm long, 2.5 to 3 cm wide and 0.1 to 0.2 mm thick; and
(e) can be made into articles by solvent-casting or extrusion which are free of haze by visual inspection under fluorescent lights.

24. The blend of claim 1 wherein component (A) is cellulose propionate having a DS per AGU of propionyl groups of about 2.1 to about 2.9.

25. The blend of claim 24 wherein component (B) is of the structure

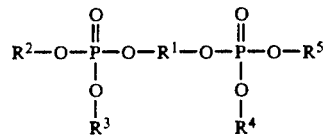

wherein $R^1$ is

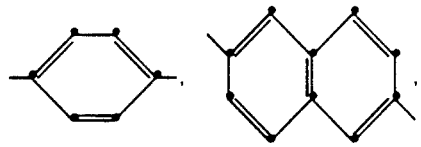

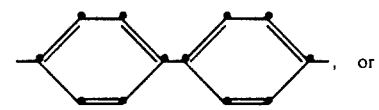, or

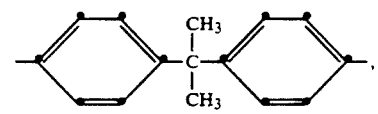, and each of $R^2$, $R^3$, $R^4$ and $R^5$ of the formula

26. A film or molded object comprising the blend of claim 25.

27. The blend of claim 24 which:
(a) retains 15% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;
(b) has a glass transition temperature less than 165° C. when measured in accordance with ASTM Procedure D-3418 modified to heat the sample at a rate of 20° C. per minute on a DuPont Autosampler Dual Cell 912;
(c) retains 97.5% of its initial weight after being heated to 180° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 120° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

28. The blend of claim 24 which:

(a) retains 17% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 155° C. when measured in accordance with ASTM Procedure D-3418 modified to heat the sample at a rate of 20° C. per minute on a DuPont Autosampler Dual Cell 912;

(c) retains 97.5% of its initial weight after being heated to 200° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 120° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

29. The blend of claim 1 wherein component (A) is cellulose butyrate having a DS per AGU of butyryl groups of about 2.1 to about 2.9.

30. The blend of claim 29 wherein component (B) is of the structure

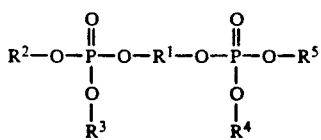

wherein
R$^1$ is

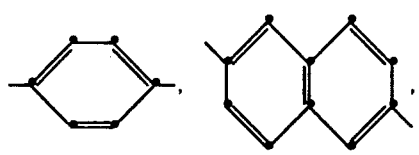

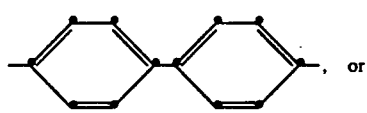

, or

-continued

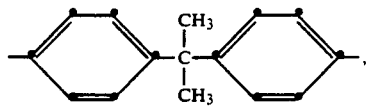

and each of R$^2$, R$^3$, R$^4$ and R$^5$ is of the formula

31. A film or molded object comprising the blend of claim 30.

32. The blend of claim 29 which:

(a) retains 12% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 130° C. when measured in accordance with ASTM Procedure D-3418 modified to heat the sample at a rate of 20° C. per minute on a DuPont Autosampler Dual Cell 912;

(c) retains 97.5% of its initial weight after being heated to 300° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 75° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

33. The blend of claim 29 which:

(a) retains 16% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 125° C. when measured in accordance with ASTM Procedure D-3418 modified to heat the sample at a rate of 20° C. per minute on a DuPont Autosampler Dual Cell 912;

(c) retains 97.5% of its initial weight after being heated to 300° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 75° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

34. The blend of claim 1 wherein component (A) is cellulose acetate butyrate having a DS per AGU of acetyl group of about 0.1 to about 2.1 and a DS per AGU of butyryl groups of about 0.5 to about 1.8.

35. The blend of claim 34 having a DS per AGU of acetyl groups to about 0.8 to about 1.2 and a DS per AGU of butyryl groups of about 1.5 to about 1.8.

36. The blend of claim 35 wherein component (B) is of the structure

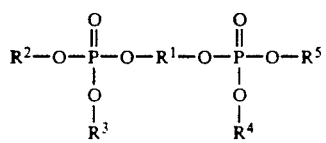

wherein R¹ is

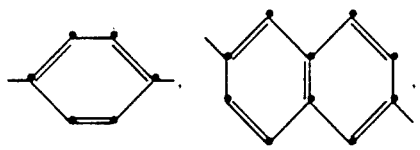

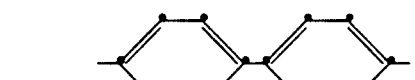, or

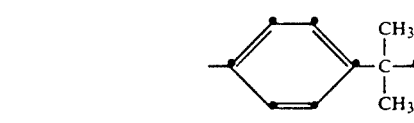

and each of R², R³, R⁴ and R⁵ is of the formula

37. A film or molded object comprising the blend of claim 36.

38. The blend of claim 35 which:

(a) retains 12% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 130° C. when measured in accordance with ASTM Procedure D-3418 modified to heat the sample at a rate of 20° C. per minute on a DuPont Autosampler Dual Cell 912;

(c) retains 97.5% of its initial weight after being heated to 300° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 75° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

39. The blend of claim 35 which:

(a) retains 16% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 125° C. when measured in accordance with ASTM Procedure D-3418 modified to heat the sample at a rate of 20° C. per minute on a DuPont Autosampler Dual Cell 912;

(c) retains 97.5% of its initial weight after being heated to 300° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 75° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

40. The blend of claim 34 wherein component (B) is of the structure

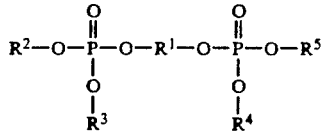

wherein R¹ is

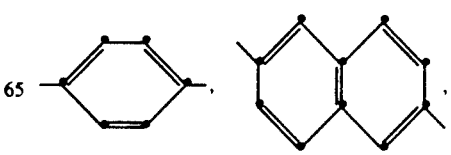

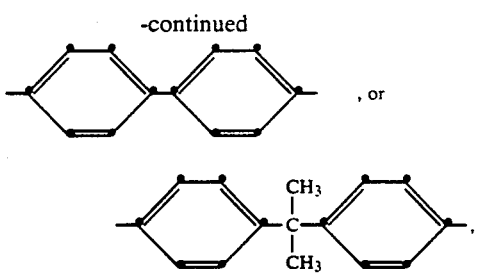, or

, and each of $R^2$, $R^3$, $R^4$ and $R^5$ is of the formula

41. A film or molded object comprising the blend of claim 40.

42. The blend of claim 34 which:
(a) retains 12% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;
(b) has a glass transition temperature less than 130° C. when measured in accordance with ASTM Procedure D-3418 modified to heat the sample at a rate of 20° C. per minute on a DuPont Autosampler Dual Cell 912;
(c) retains 97.5% of its initial weight after being heated to 300° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;
(d) has less than 2% elongation when heated to 75° C. when measured in accordance with ASTM Procedure D-1637 on blends made into films that are from 10 to 14 cm long, 2.5 to 3 cm wide and 0.1 to 0.2 mm thick; and
(e) can be made into articles by solvent-casting or extrusion which are free of haze by visual inspection under fluorescent lights.

43. The blend of claim 34 which:
(a) retains 16% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;
(b) has a glass transition temperature less than 125° C. when measured in accordance with ASTM Procedure D-3418 modified to heat the sample at a rate of 20° C. per minute on a DuPont Autosampler Dual Cell 912;
(c) retains 97.5% of its initial weight after being heated to 300° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;
(d) has less than 2% elongation when heated to 75° C. when measured in accordance with ASTM Procedure D-1637 on blends made into films that are from 10 to 14 cm long, 2.5 to 3 cm wide and 0.1 to 0.2 mm thick; and
(e) can be made into articles by solvent-casting or extrusion which are free of haze by visual inspection under fluorescent lights.

44. The blend of claim 1 wherein component (A) is cellulose acetate propionate having a DS per AGU of acetyl groups of about 0.1 to about 2.1 and a DS per AGU of propionyl groups of about 0.4 to about 2.7.

45. The blend of claim 44 having a DS per AGU of acetyl groups of about 1.5 to abut 2.1 and a DS per AGU of propionyl groups of about 0.5 to about 1.5.

46. The blend of claim 45 wherein component (B) is of the structure

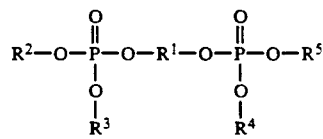

wherein $R^1$ is

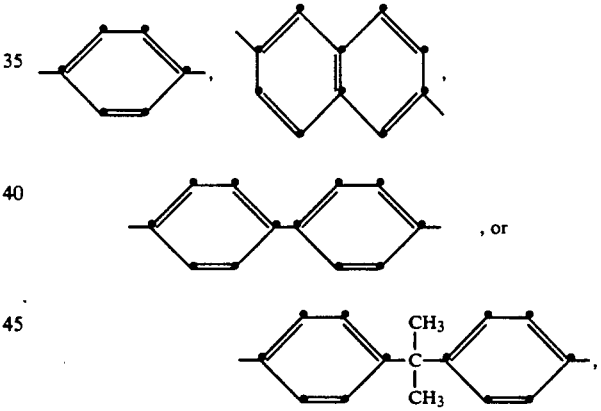

and each of $R^2$, $R^3$, $R^4$ and $R^5$ is of the formula

47. A film or molded object comprising the blend of claim 46.

48. The blend of claim 45 which:
(a) retains 15% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 165° C. when measured in accordance with ASTM Procedure D-3418 modified to heat the sample at a rate of 20° C. per minute on a DuPont Autosampler Dual Cell 912;

(c) retains 97.5% of its initial weight after being heated to 180° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 120° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

49. The blend of claim 45 which:

(a) retains 15% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 165° C. when measured in accordance with ASTM Procedure D-3418 modified to heat the sample at a rate of 20° C. per minute on a DuPont Autosampler Dual Cell 912;

(c) retains 97.5% of its initial weight after being heated to 180° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 120° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

50. The blend of claim 44 wherein component (B) is of the structure $$R^2-O-\underset{\underset{R^3}{\overset{O}{|}}}{\overset{\overset{O}{\|}}{P}}-O-R^1-O-\underset{\underset{R^4}{\overset{O}{|}}}{\overset{\overset{O}{\|}}{P}}-O-R^5$$

wherein
R$^1$ is

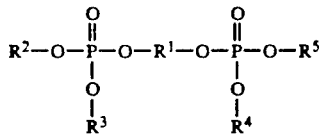

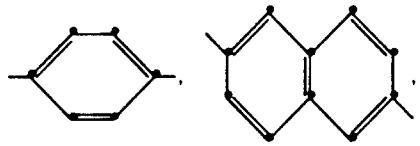

, or

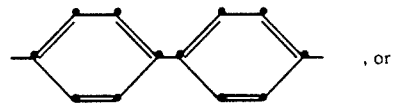

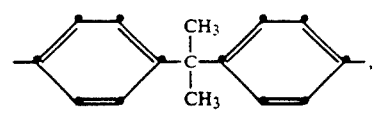

and each of R$^2$, R$^3$, R$^4$ and R$^5$ is of the formula

51. A film or molded object comprising the blend of claim 50.

52. The blend of claim 44 which:

(a) retains 15% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 165° C. when measured in accordance with ASTM Procedure D-3418 modified to heat the sample at a rate of 20° C. per minute on a DuPont Autosampler Dual Cell 912;

(c) retains 97.5% of its initial weight after being heated to 180° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 120° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

53. The blend of claim 44 which:

(a) retains 15% or more of its initial weight after being heated to 400° C. when measured in accordance with ASTM Procedure D-3850 modified to heat the sample at 20° C. per minute from room temperature to 500° C. in a stream of air having a dew point less than −10° C. and flowing over the sample at a rate from 0.5 to 4 scfh tested on a DuPont Thermogravimetric Analyzer 951;

(b) has a glass transition temperature less than 165° C. when measured in accordance with ASTM Procedure D-3418 modified to heat the sample at a rate of 20° C. per minute on a DuPont Autosampler Dual Cell 912;

(c) retains 97.5% of its initial weight after being heated to 180° C. when measure in accordance with ASTM Procedure D-3850 modified to heat the sample at 20° C. per minute from room temperature to 500° C. in a stream of air having a dew point less than −10° C. and flowing over the sample at a rate from 0.5 to 4 schf;

(d) has less than 2% elongation when heated to 120° C. when measured in accordance with ASTM Procedure D-1637 on blends made into films that are from 10 to 14 cm long, 2.5 to 3 cm wide and 0.1 to 0.2 mm thick; and (e) can be made into articles by solvent-casting or extrusion which are free of haze by visual inspection under fluorescent lights.

54. The blend of claim 1 wherein component (A) is cellulose propionate butyrate having a DS per AGU of propionyl groups of about 0.4 to about 2.7 and a DS per AGU of butyryl groups of about 0.3 to about 2.6.

55. The blend of claim 54 wherein component (B) is of the structure

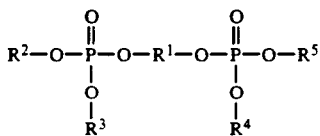

wherein
$R^1$ is

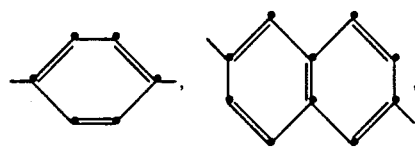

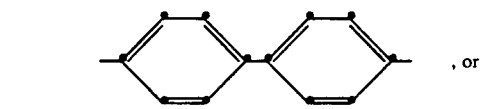

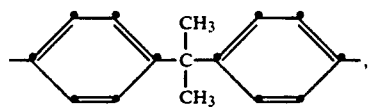

and each of $R^2$, $R^3$, $R^4$ and $R^5$ is of the formula

56. A film or molded object comprising the blend of claim 55.

57. The blend of claim 1 wherein said arylene-bis(diaryl phosphate) compound is of the formula

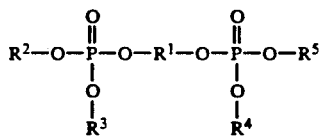

wherein
$R^1$ is selected from one of the following structures:

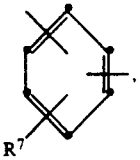

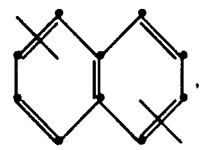

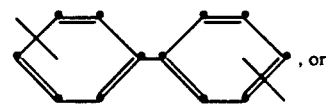

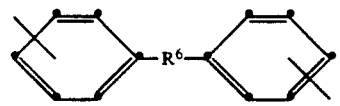

wherein any of the above $R^1$ structures may be substituted with one or more halogen atoms,
$R^2$ is

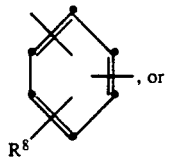

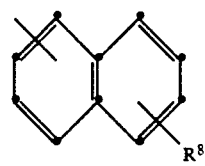

each of $R^3$, $R^4$, and $R^5$, independently, has the same meaning as $R^2$,
$R^6$ is

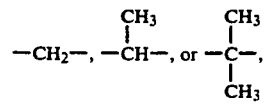

$R^7$ is H, aryl, haloaryl, A $C_1$-$C_8$ straight or branched chain alkyl, a $C_1$-$C_8$ straight or branched chain alkyl substituted with one or more halogen atoms, or a $C_1$-$C_8$ alkoxy, and $R^8$ is $R^7$ or a halogen atom.

58. The blend of claim 57 wherein $R^1$ is non-halogenated and $R^8$ is other than halogen.

59. The blend of claim 57 wherein $R^1$ is of the structure:

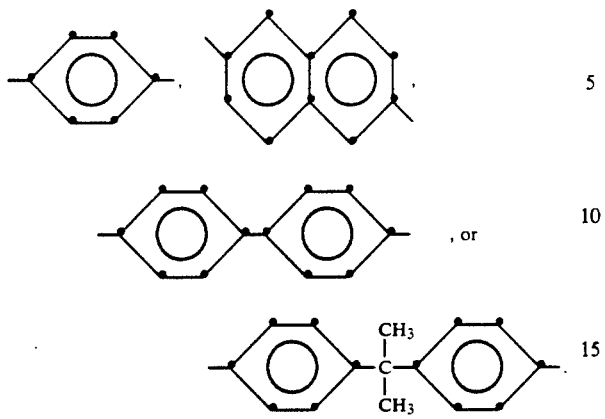

60. The blend of claim 57 wherein each of the $R^2$, $R^3$, $R^4$ and $R^5$ moieties are independently of the structure:

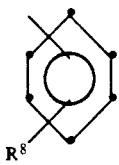

and $R^8$ is other than halogen.

61. The blend of claim 60 wherein $R^2$, $R^3$, $R^4$ and $R^5$ are the same.

62. The blend of claim 57 wherein the $R^7$ and $R^8$ moieties are, independently, H, $C_1$–$C_8$ straight chain alkyls, $C$–$C_8$ branched chain alkyls or $C_1$–$C_8$ alkoxys.

63. The blend of claim 57 wherein the $R^7$ and $R^8$ moieties are, independently, H, $C_1$–$C_4$ straight chain alkyls, $C_1$–$C_4$ branched chain alkyls, or $C_1$–$C_4$ alkoxys.

64. The blend of claim 57 wherein the $R^7$ and $R^8$ moieties are H.

65. The blend of claim 57 wherein $R^6$ is —CH$_2$— or $$-\underset{\underset{CH_3}{|}}{\overset{\overset{CH_3}{|}}{C}}-$$

66. The blend of claim 1 wherein component (B) is p- or m-phenylene bis(diphenyl phosphate); 1,6- or 2,7-naphthylene bis(diphenyl phosphate); p- or m-phenylene bis((di-chlorophenyl) phosphate); 1,6- or 2,7-naphthylene bis((di-chlorophenyl) phosphate); p- or m-phenylene bis((di-methoxyphenyl) phosphate); or 1,6- or 2,7-naphthylene bis((di-methoxyphenyl) phosphate).

67. The blend of claim 1 wherein component (B) is of the structure

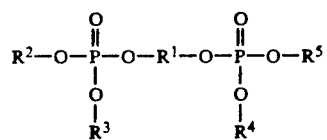

wherein
$R^1$ is

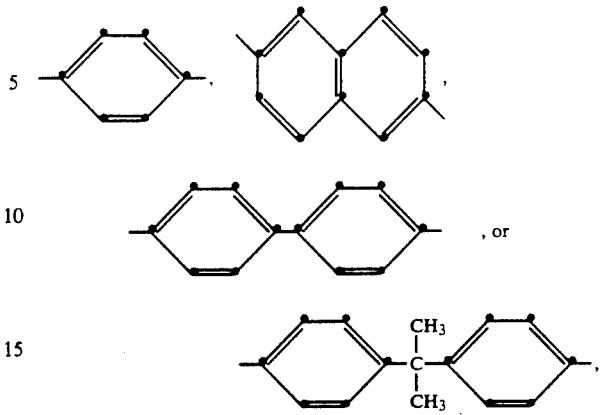

and each of $R^2$, $R^3$, $R^4$ and $R^5$ is of the formula

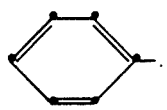

68. A film or molded object comprising the blend of claim 67.

69. The blend of claim 1 wherein said arylene-bis(diaryl phosphate) compound has one or more of the following characteristics:
 (1) when blended with a cellulose ester at a concentration of 6 weight % and formed into a film by solvent-casting or melt-casting, the film is clear,
 (2) when blended with a cellulose ester at a concentration of 6 weight % and the blend is formed into a film by solvent-casting or melt-casting, the glass transition temperature, as measured by ASTM Procedure D-3418 modified to heat the sample at a rate of 20° C. per minute, of the film is 7 or more degrees Centigrade lower than a film of the same cellulose ester without the compound and
 (3) when heated in air using ASTM Procedure D-3850 modified to heat the sample at 20° C. per minute, less than 2.5 percent of the compound's weight is lost when the compound reaches 225° C.

70. The blend of claim 1 which is amorphous or has a melting point of about 130° C. to about 280° C.

71. The blend of claim 1 which:
 (a) retains 85% as much of its original weight after being heated to 400° C. as a control blend of the same cellulose ester formulated with triphenyl phosphate as a substitute for the same amount of component (B);
 (b) has a glass transition temperature that is 7° C. or more below the glass transition temperature of the same blend made from the same cellulose ester formulated without component (B);
 (c) the highest temperature to which said blend can be heated while still retaining 97.5% of its initial weight is not more than 30° C. below the highest temperature which a control blend of the same cellulose ester formulated with triphenyl phosphate as a substitute for the same amount of component (B) can be heated while still retaining 97.5% of its initial weight;
 (d) elongates 2% at temperatures which are not more than 5° C. lower than a blend of the same cellulose ester formulated with triphenyl phosphate as a substitute for the same amount of component (B); and (e) can be made into articles by solvent-casting or extrusion which are free of haze by visual inspection under fluorescent lights.

72. The blend of claim 1 which:
(a) retains at least as much as the original weight of the blend after being heated to 400° C. as a control blend of the same cellulose ester formulated with triphenyl phosphate as a substitute for the same amount of component (B);
(b) has a glass transition temperature that is 11° C. or more below the glass transition temperature of the same blend made from the same cellulose ester formulated without component (B);
(c) the highest temperature to which said blend can be heated while still retaining 97.5% of its initial weight is 5° C. or more above the highest temperature which a control blend of the same cellulose ester formulated with triphenyl phosphate as a substitute for the same amount of component (B) can be heated while still retaining 97.5% of its initial weight;
(d) elongates 2% at temperatures which are 5° C. or than 5° C. higher than a blend of the same cellulose ester formulated with triphenyl phosphate as a substitute for the same amount of component (B); and
(e) can be made into articles by solvent-casting or extrusion which are free of haze by visual inspection under fluorescent lights.

73. The film or molded object comprising the blend of claim 1.

* * * * *

UNITED STATES PATENT AND TRADEMARK OFFICE
CERTIFICATE OF CORRECTION

PATENT NO. : 5,104,450
DATED : April 14, 1992
INVENTOR(S) : I. Daniel Sand et al.

Page 1 of 3

It is certified that error appears in the above-identified patent and that said Letters Patent is hereby corrected as shown below:

Column 36, line 59 (Claim 7, line 6), "12.5%" should be ---1.5%---.

Column 37, line 6 (Claim 10, line 4), "ia bout" should be ---is about---.

Column 38, line 34 (Claim 18, line 2), "ia bout" should be ---is about---.

Column 39, line 7 (Claim 20), between "$R^5$" and "of the formula", ---is--- should be inserted.

Column 39, line 37 (Claim 22, line 21), "schf;" should be ---scfh;---.

Column 39, line 66 (Claim 23, line 21), "schf;" should be ---scfh;---.

Column 40, line 40 (Claim 25), between "$R^5$" and "of the formula", ---is--- should be inserted.

Column 40, line 65 (Claim 27, line 16), "measure" should be ---measured---.

Column 41, line 2 (Claim 27, line 21), "schf;" should be ---scfh;---.

Column 42, line 38 (Claim 32, line 21), "schf;" should be ---scfh;---.

UNITED STATES PATENT AND TRADEMARK OFFICE
CERTIFICATE OF CORRECTION

PATENT NO. : 5,104,450

DATED : April 14, 1992

INVENTOR(S) : I. Daniel Sand et al.

It is certified that error appears in the above-identified patent and that said Letters Patent is hereby corrected as shown below:

Column 42, line 68 (Claim 33, line 21), "schf;" should be ---scfh;---.

Column 44, line 9 (Claim 38, line 21), "schf;" should be ---scfh;---.

Column 44, line 40 (Claim 39, line 21), "schf;" should be ---scfh;---.

Column 45, line 42 (Claim 42, line 21), "schf;" should be ---scfh;---.

Column 46, line 3 (Claim 43, line 21), "schf;" should be ---scfh;---.

Column 47, line 12 (Claim 48, line 21), "schf;" should be ---scfh;---.

Column 47, line 41 (Claim 49, line 21), "schf;" should be ---scfh;---.

Column 48, line 43 (Claim 52, line 21), "schf;" should be ---scfh;---.

Column 49, line 4 (Claim 53, line 21), "schf;" should be ---scfh;---.

Column 51, line 35 (Claim 62, line 3), "$C-C_8$" should be ---$C_1-C_8$---.

UNITED STATES PATENT AND TRADEMARK OFFICE
CERTIFICATE OF CORRECTION

PATENT NO. : 5,104,450

DATED : April 14, 1992

INVENTOR(S) : I. Daniel Sand et al.

It is certified that error appears in the above-identified patent and that said Letters Patent is hereby corrected as shown below:

Column 52, line 50 (Claim 71, line 2), between "retains" and "85%", ---at least--- should be inserted.

Column 54, line 16 (Claim 73, line 1), "The" should be ---A---.

Signed and Sealed this

Twenty-second Day of June, 1993

Attest:

MICHAEL K. KIRK

Attesting Officer

Acting Commissioner of Patents and Trademarks